US012626105B2

(12) United States Patent
Esmaeilzadeh et al.

(10) Patent No.: US 12,626,105 B2
(45) Date of Patent: May 12, 2026

(54) STOCHASTIC NOISE LAYERS

(71) Applicant: Protopia AI, Inc., Austin, TX (US)

(72) Inventors: Hadi Esmaeilzadeh, Austin, TX (US); Anwesa Choudhuri, Austin, TX (US)

(73) Assignee: Protopia AI, Inc., Austin, TX (US)

( * ) Notice: Subject to any disclaimer, the term of this patent is extended or adjusted under 35 U.S.C. 154(b) by 1083 days.

(21) Appl. No.: 17/680,108

(22) Filed: Feb. 24, 2022

(65) Prior Publication Data

US 2022/0269928 A1 Aug. 25, 2022

Related U.S. Application Data

(60) Provisional application No. 63/227,846, filed on Jul. 30, 2021, provisional application No. 63/153,284, filed on Feb. 24, 2021.

(51) Int. Cl.
*G06N 3/047* (2023.01)
(52) U.S. Cl.
CPC .................................... *G06N 3/047* (2023.01)
(58) Field of Classification Search
CPC ...................................................... G06N 3/047
See application file for complete search history.

(56) References Cited

U.S. PATENT DOCUMENTS

| | | | |
|---|---|---|---|
| 10,108,850 B1 * | 10/2018 | Das | G06V 10/82 |
| 10,621,378 B1 | 4/2020 | Kim | |
| 10,621,379 B1 | 4/2020 | Kim | |

| | | |
|---|---|---|
| 10,956,598 B1 | 3/2021 | Lee |
| 11,017,319 B1 | 5/2021 | Kim |
| 11,017,320 B1 | 5/2021 | Kim |
| 11,023,777 B1 | 6/2021 | Koo |

(Continued)

FOREIGN PATENT DOCUMENTS

| | | |
|---|---|---|
| CN | 112200710 A | 1/2021 |
| KR | 102107021 B1 | 5/2020 |

(Continued)

OTHER PUBLICATIONS

Mathias Lecuyer et al., "Certified Robustness to Adversarial Examples with Differential Privacy," arXiv:1802.03471v4, May 2019 [retrieved on May 31, 2025], retrieved from [https://arxiv.org/pdf/1802.03471v4.pdf] (Year: 2019).*

(Continued)

*Primary Examiner* — Jeremy L Stanley
(74) *Attorney, Agent, or Firm* — Pillsbury Winthrop Shaw Pittman, LLP

(57) ABSTRACT

Provided is a process including: obtaining, with a computer system, with a stochastic layer of a multi-layer neural network, inputs to the stochastic layer from, wherein the multi-layer neural network comprises both deterministic layers and the stochastic layer, and the stochastic layer comprises a plurality of parameters that vary stochastically according to respective probability distributions; determining values of the plurality of parameters by randomly sampling from the statistical distributions; determining an output of the stochastic layer based on both the determined values of the plurality of parameters and the inputs to the stochastic layer; and providing the output of the stochastic layer to a downstream layer of the multi-layer neural network or as an output of the multi-layer neural network.

24 Claims, 8 Drawing Sheets

(56) References Cited

U.S. PATENT DOCUMENTS

| | | | |
|---|---|---|---|
| 11,164,046 B1 | 11/2021 | Kim | |
| 11,200,342 B1 | 12/2021 | Kim et al. | |
| 11,200,494 B1 | 12/2021 | Kim | |
| 11,308,359 B1 | 4/2022 | Jeong et al. | |
| 11,366,930 B1 | 6/2022 | Jeong et al. | |
| 11,388,330 B1 | 7/2022 | Kim | |
| 2012/0084464 A1 | 4/2012 | Cochinwala et al. | |
| 2014/0279777 A1* | 9/2014 | Cornebise | G06N 3/045 |
| | | | 706/22 |
| 2017/0243028 A1 | 8/2017 | LaFever et al. | |
| 2017/0316346 A1 | 11/2017 | Park et al. | |
| 2018/0075338 A1 | 3/2018 | Gokmen | |
| 2018/0129930 A1* | 5/2018 | Shin | G06N 3/047 |
| 2019/0095629 A1 | 3/2019 | Lee et al. | |
| 2019/0095798 A1* | 3/2019 | Baker | G06F 18/24 |
| 2019/0147188 A1 | 5/2019 | Benaloh et al. | |
| 2019/0188537 A1* | 6/2019 | Dutta | G06F 18/24 |
| 2019/0188830 A1 | 6/2019 | Edwards et al. | |
| 2019/0347410 A1 | 11/2019 | Kesarwani et al. | |
| 2019/0370647 A1 | 12/2019 | Doshi et al. | |
| 2020/0034520 A1 | 1/2020 | Kim | |
| 2020/0034565 A1 | 1/2020 | Kim | |
| 2020/0037198 A1 | 1/2020 | Itoh et al. | |
| 2020/0050962 A1 | 2/2020 | Kim | |
| 2020/0201957 A1 | 6/2020 | Kim | |
| 2020/0311520 A1* | 10/2020 | Zhao | G06V 10/764 |
| 2020/0356904 A1 | 11/2020 | Jordan et al. | |
| 2020/0412743 A1 | 12/2020 | Angel et al. | |
| 2021/0034985 A1* | 2/2021 | Vongkulbhisal | G06F 16/908 |
| 2021/0049460 A1* | 2/2021 | Ahn | G06N 3/047 |
| 2021/0056405 A1 | 2/2021 | Bradshaw et al. | |
| 2021/0097394 A1* | 4/2021 | Cheng | G06N 3/082 |
| 2021/0117760 A1* | 4/2021 | Krishnan | G06N 3/08 |
| 2021/0256389 A1* | 8/2021 | Gross | G06N 3/063 |
| 2021/0350239 A1* | 11/2021 | Wang | G06F 18/213 |
| 2021/0357680 A1* | 11/2021 | Chen | G06N 3/047 |
| 2022/0012549 A1* | 1/2022 | Nielsen | G06V 10/776 |
| 2022/0027668 A1* | 1/2022 | Rhee | G06V 10/82 |
| 2022/0101106 A1* | 3/2022 | Van Der Wilk | G06N 3/063 |
| 2022/0101197 A1* | 3/2022 | Passenheim | G06N 20/00 |
| 2022/0121884 A1* | 4/2022 | Zadeh | G06N 3/006 |
| 2022/0269279 A1* | 8/2022 | Redford | G06N 3/006 |
| 2022/0366284 A1* | 11/2022 | Adam | G06N 20/00 |
| 2023/0007985 A1 | 1/2023 | Kim | |
| 2023/0222336 A1* | 7/2023 | Redford | G06N 20/00 |
| | | | 706/20 |
| 2023/0229892 A1* | 7/2023 | Biswas | G06N 3/0455 |
| | | | 704/500 |
| 2024/0046075 A1* | 2/2024 | Chen | G06N 3/084 |

FOREIGN PATENT DOCUMENTS

| | | | |
|---|---|---|---|
| KR | 102035796 B1 | 12/2022 | |
| KR | 102473801 B1 | 12/2022 | |

OTHER PUBLICATIONS

International Search Report in related international application PCT/US21/21227 dated Jul. 21, 2021, pp. 1-4.

Written Opinion in related international application PCT/US21/21227 dated Jul. 21, 2021, pp. 1-6.

International Preliminary Report on Patentability in related international application PCT/US21/021227 dated Sep. 6, 2022, pp. 1-7.

Mireshghallah et al., "Shredder: Learning Noise Distributions to Protect Inference Privacy," ASPLOS '20: Proceedings of the Twenty-Fifth International Conference on Architectural Support for Programming Languages and Operating Systems, Mar. 13, 2020, https://doi.org/10.1145/3373376.3378522, pp. 1-16.

Mireshghallah et al., "Shredder: Learning Noise to Protect Privacy with Partial DNN Inference on the Edge," CoRR, abs/1905.11814 6 (2019), https://cseweb.ucsd.edu/~hadi/doc/paper/2019-icml-shredder.pdf, pp. 1-12.

Internet Archive of "Need-to-Know AI Data, Delivered," Protopia AI to demo at NeurIPS 2021! captured Jan. 12, 2022, https://web.archive.org/web/20220112015111/https://protopia.ai/, pp. 1-10.

GitHub-Protopia-ai/dem: Protopia AI Demo Sep. 17, 2021, https://github.com/protopia-ai/demo, pp. 1-3.

International Search Report and Written Opinion in related international application PCT/US2022/017759 dated Jun. 10, 2022, pp. 1-12.

Mathias Lecuyer et al., 'Certified Robustness to Adversarial Examples with Differential Privacy', arXiv:1802.03471v4, May 2019 [retrieved on May 11, 2022], pp. 1-18, Retrieved from <https://arxiv.org/pdf/1802.03471v4.pdf>.

Zhezhi He et al., 'Parametric Noise Injection: Trainable Randomness to Improve Deep Neural Network Robustness Against Adversarial Attack', 2019 IEEE/CVF Conference on Computer Vision and Pattern Recognition (CVPR), Jan. 2020, pp. 1-10.

Zhonghui You et al., 'Adversarial Noise Layer: Regularize Neural Network By Adding Noise', arXiv:1805.08000v2, Oct. 2018 [retrieved on May 10, 2022]. Retrieved from <https://arxiv.org/pdf/1805.08000v2.pdf>.

* cited by examiner

STOCHASTIC NOISE LAYERS

CROSS-REFERENCE TO RELATED APPLICATIONS

This application claims the benefit of U.S. Provisional Pat. App. 63/227,846, titled STOCHASTIC LAYERS, filed 30 Jul. 2021, and claims the benefit of U.S. Provisional Pat. App. 63/153,284, titled METHODS AND SYSTEMS FOR SPECIALIZING DATASETS FOR TRAINING/VALIDATION OF MACHINE LEARNING, filed 24 Feb. 2021, the entire content of each of which is hereby incorporated by reference.

BACKGROUND

Machine learning models, including neural networks, have become the backbone of intelligent services and smart devices, such as smart security cameras or voice assistants. To operate, the machine learning models may process input data and generated output data based on transformation occurring in one or more layers of the models, at least in the case of deep neural network machine learning models.

SUMMARY

The following is a non-exhaustive listing of some aspects of the present techniques. These and other aspects are described in the following disclosure.

Some aspects include application of a stochastic layer within a machine learning model.

Some aspects include application of a stochastic weighting within a machine learning model.

Some aspects include optimization of stochastic noise for defense of a machine learning model.

Some aspects include vulnerability analysis for a machine learning model.

Some aspects include a tangible, non-transitory, machine-readable medium storing instructions that when executed by a data processing apparatus cause the data processing apparatus to perform operations including the above-mentioned application.

Some aspects include a system, including: one or more processors; and memory storing instructions that when executed by the processors cause the processors to effectuate operations of the above-mentioned application.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
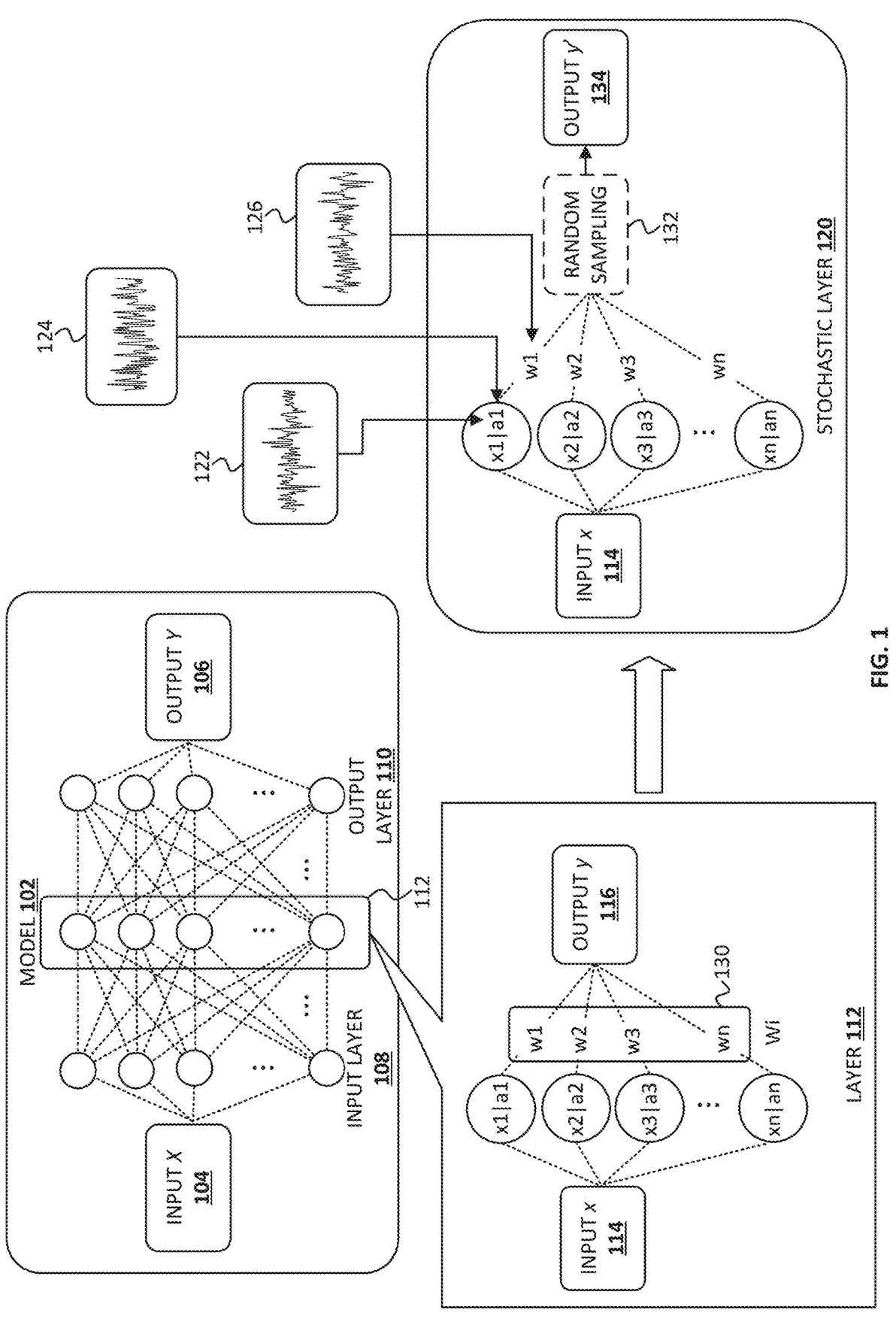
FIG. 1 depicts an example machine learning model including a stochastic layer, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the fields of machine learning and computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In operation, machine learning models (also referred to as just models) can be subject to model exfiltration attacks, whereby a threat actor systematically probes the model and attempts to infer model architecture and parameter values or develop a training set to train another model to approximate the existing model. In some instances, observation of the relationship between input and output can allow a malicious actor to predict a model's behavior or reconstruct at least a part of the model, often even without access to the model's parameters and only the ability to provide inputs and observe corresponding outputs.

These attacks are expected to be a source of concern for those operating and developing machine learning models. In many cases, a machine learning model can be expensive or difficult to train and can embody trade secrets or other intellectual property. Further, insights into model architecture and parameters can aid threat actors attempting to design adversarial attacks against the model.

To mitigate these issues or others, some embodiments augment neural networks or other machine learning models with stochastic elements, like stochastic noise layers (also referred to as stochastic layers or noise layers, interchangeably). In some embodiments, the stochastic noise layers are trained (either initially, or in a second round of training, after the initial deterministic version of the model is trained) to obscure the operations of the machine learning models while preserving adequate model performance. In some stochastic noise layers, noise is applied to input or output of the layer. In some stochastic noise layers, noise is applied to weights or other parameters of the layer or relationship between layers. Application of noise can take a variety of forms, including addition, subtraction, multiplication, or division with existing parameter values or inputs or outputs.

Some embodiments augment otherwise deterministic neural networks with one or more stochastic layers in which parameters of the layers (e.g., some or all of the weights of a subset of layers in a neural network) are randomly (e.g., pseudo-randomly) sampled from probability distributions (also called noise distributions, or just distributions) learned during training. In some embodiments of stochastic noise layers, the weights or biases of a layer are deterministic, but the output of the layer is used to determine the parameters of a set of corresponding probability distributions that are randomly sampled from to determine the output of the respective layer. Some embodiments learn parameters of parametric probability distributions, like a mean and variance for a Gaussian distribution, or $\mu$ and b for a Laplace distribution, for each respective model parameter to be rendered stochastic, e.g., each such model parameter may have its own respective learned distribution, from which the value of the respective model parameter is determined based on randomly sampling form the respective distribution responsive to each instance of an input.

As a result, in some embodiments, exfiltration attacks are expected to be impeded. Repeated inputs of the same record may product variation in corresponding outputs of those stochastic noise layers, as different values are expected to be sampled from the probability distributions in each iteration. This variation is expected to impede attempts to exfiltrate the model, e.g., by probing the model (like by fuzzing the model) with inputs and then attempting to train a cloned model on the respective input-output pairs. The variation, however, is crafted in some embodiments to avoid or decrease the likelihood of excessively impairing model performance, so the model, in some embodiments, has adequate accuracy even with the noise added.

Moreover, in some embodiments, the stochastic noise layers are computationally efficient to train relative to other approaches. Some stochastic neural networks are difficult to train because their objective function is non-differentiable. As a result, relatively efficient training techniques are not suitable for training those models, like various forms of gradient descent that compute a local derivative of model parameters with respect to the objective function (or vice versa) to determine directions to adjust parameter values locally to be more optimal. Lack of differentiability can have the effect of capping the model size and limiting degrees of freedom useful for learning to perform useful tasks. Further, some stochastic neural networks are difficult to train because every layer is stochastic, which is expected to excessively increase the computational complexity associated with training larger models. That said, none of the discussion of tradeoffs with various approaches should be read as a disclaimer, which is not to suggest that any other similar discussion herein is intended to be a disclaimer.

Some embodiments are expected to enhance interpretability (also referred to as explainability) of trained models. Model parameters having associated distributions with larger dispersion (e.g., variance) are expected to explain outputs given inputs less than model parameters having associated distributions with smaller dispersion. In some cases, a model parameter that can accommodate a large amount of noise without impairing the model's performance has relatively little effect on how the model behaves.

Some embodiments are expected to be helpful for compressing trained models. In some cases, perceptrons with model parameters having associated distributions exceeding a threshold size may be pruned from the model or changed to have a constant output, regardless of input, to compress the model, potentially reducing the amount of memory consumed by the model and expediting computation of model outputs.

Various affordances expected of some embodiments are described, but it should be emphasized that embodiments are not limited to implementations providing all or any of these benefits, which is not to suggest that any other description is limiting.

Stochastic layers can be categorized based on their architecture and type of model in which they reside. Examples of layers of networks include convolutional layers, fully connected layers, deconvolutional layers, and recurrent layers. Examples of types of model architectures include deep neural networks, like convolutional neural networks, autoencoders, transformer architectures, recurrent networks (including long short-term memory (LSTM) networks), etc. Such model architectures may implement things like computer vision techniques to detect or localize objects in video, audio classification models, natural language processing techniques, reinforcement learning models, and the like. Convolutional stochastic layers and fully connected stochastic layers are discussed in depth below by way of example, but techniques herein can be applied to other model architectures and layers, which is not to suggest that any other description is limiting.

FIG. 1 depicts an example of a machine learning model 102 including a stochastic layer 112, in accordance with some embodiments. The model 102 may be trained by system 602 described below and may be deployed in the same system or user device 604 for inference-time operations.

In some embodiments, the machine learning model 102 generates an output Y 106 based on an input X 104. The machine learning model 102 may include an input layer 108, which in some embodiments, receives the input X 104, an output layer 110, which in some embodiments, outputs the output Y 106, and one or more hidden layers 112. The layer 112 may receive an input x 114, which in some embodiments may be a value of a dimension of an input vector or may include one or more outputs of an upstream layer, and may produce an output y 116, which may be an activation or other output and which may be input into a subsequent layer of the model or serve as a value of a dimension of an output vector of the model. The layer 112 may produce multiple outputs $y_i$, but for simplicity only one is depicted. The layer input can be transformed into the layer output through any appropriate operation, including convolution, linear mathematical operations, weighting, etc. The layer 112 is depicted as receiving the input x 114, which is received at each of the n nodes of the layer as $n_i$. The operation of the layer upon the input is depicted as $x_i|a_i$, where $a_i$ represents an operation occurring at the nodes. The operation may instead be represented as $f(x_i)$. The outputs (or input, depending on perspective) of the nodes can be weighted, according to a weighting vector or tensor W 130.

In some embodiments, one or more stochastic layers, such as stochastic layer 120, may be learned as a form of augmentation to a previously trained model (or concurrently with training of the model). In some embodiments, the stochastic layer 120 is an additional layer added to an extant model, or the model may be created initially with the stochastic layer 120 in place. In some embodiments, an existing layer is transformed into a stochastic layer by code that samples for the corresponding probability distribution for respective model parameters and determines the value of the model parameter based on the sampled value, e.g., using the sampled value itself, or computing the model parameter based on the sampled value, for instance by adding, subtracting, dividing, or multiplying with some constant. In some embodiments, the stochastic layer 120 is a layer of the model to which stochastic noise is applied. The noise can be applied additively, multiplicatively, linearly, etc.

For the example stochastic layer 120, stochastic noise elements 122, 124, and 126 are depicted. The stochastic noise elements 122, 124, and 126 can be implemented by random samplings of one or more corresponding probability distributions, e.g., taking one sample for each run of the model on a new input for each model parameter for which a noise distribution has been learned. The stochastic noise element 122 may be applied to the operation of the layer at the node e.g., applied to $x_i|a_i$ or $f(x_i)$ such that $x_i|a_i$ becomes $x_i|(a_i + \mathcal{N}(\rho, \sigma))$ or $f(x_i)$ becomes $f(x_i + \mathcal{N}(\mu, \sigma))$. The stochastic noise element 124 may be applied to output of the layer at each of the nodes (e.g., such that the output of $f(x_i)$ becomes $f(x_i) + \mathcal{N}(\mu, \sigma)$). The stochastic noise element 126 may be applied to one or more weighting parameters applied to the output of the nodes of the layer (e.g., such that $w_i$ becomes $w_i + \mathcal{N}(\mu, \sigma)$). These are example locations and application of the stochastic noise elements 122, 124, 126, and more or fewer locations and instances of stochastic noise application can be implemented. The stochastic layer 120 can also include one or more instance of random sampling 132, where such sampling can be probabilistic, quasi-random, etc. The stochastic layer 120, in some embodiments, generates an output y' 134, which may vary from the output y 116 of a non-stochastic version of the stochastic layer 120 and may vary for the same input between instances in which that input is applied.

In an example convolutional neural network (CNN), one or more hidden layers of the CNN may perform convolutional operations upon input to generate output. In some embodiments, convolution involves an operation where a kernel k is convolved across an input tensor x, performing a linear mathematical operation between one or more values of the kernel k and at least a portion of the tensor x at locations of the tensor x. The output of the convolution of the input x and the kernel k may be represented by a tensor $h_k$. The outputs of the various kernels k are stacked into channels to form the output $h=[h_k]$. The convolution operation, in some embodiments, can be represented by Equation 1, below:

$$h_k[m, n] = (x * k)[m, n] = \sum_i \sum_j k[i, j] \, x[m + i, n + j] \qquad (1)$$

where [m,n] represents the spatial coordinates of the output tensor $h_k$, and [i,j] represents the spatial coordinates of the kernel k.

The input of the convolutional layer may be a tensor with a shape given by (number of inputs)×(input height)×(input width)×(input channels)—that is the number of inputs by the size of the input by the depth of channels of the input. The convolutional layer can abstract the input to a generate an output (e.g., a feature map, which can be an activation map) with a shape given by (number of inputs)×(feature map height)×(feature map width)×(feature map channels). The output of the convolutional layer can have the same or a different size than the input.

The convolution can be described by various hyperparameters, which can be a value describing an original or external configuration of the model, like a parameter that is not adjusted during a given instance of training, but may be adjusted between instances of training. Hyperparameters can be set, including heuristically, and may not be estimable from training or other data. Hyperparameters can include the width and height of the of the kernels or other convolutional filters, the number of input channels, the number of output channels, additional hyperparameters including padding, stride, dilation, etc. Hyperparameters can be set, limited, or otherwise chosen based on model type, model structure, etc. For example, the number output channels of a first layer (i.e., its depth) may be the number of input channels of a subsequent layer. Hyperparameters may be tuned or otherwise adjusted to optimize the model. Optimization methods can include gradient descent or other methods and can depend on model type. A hyperparameter can be used to control the learning of the machine learning model and is generally not a learned parameter. Other parameters, including include node weights which are generally not hyperparameters, can be learned or estimate, including based on data (e.g., training data).

Figure 2:
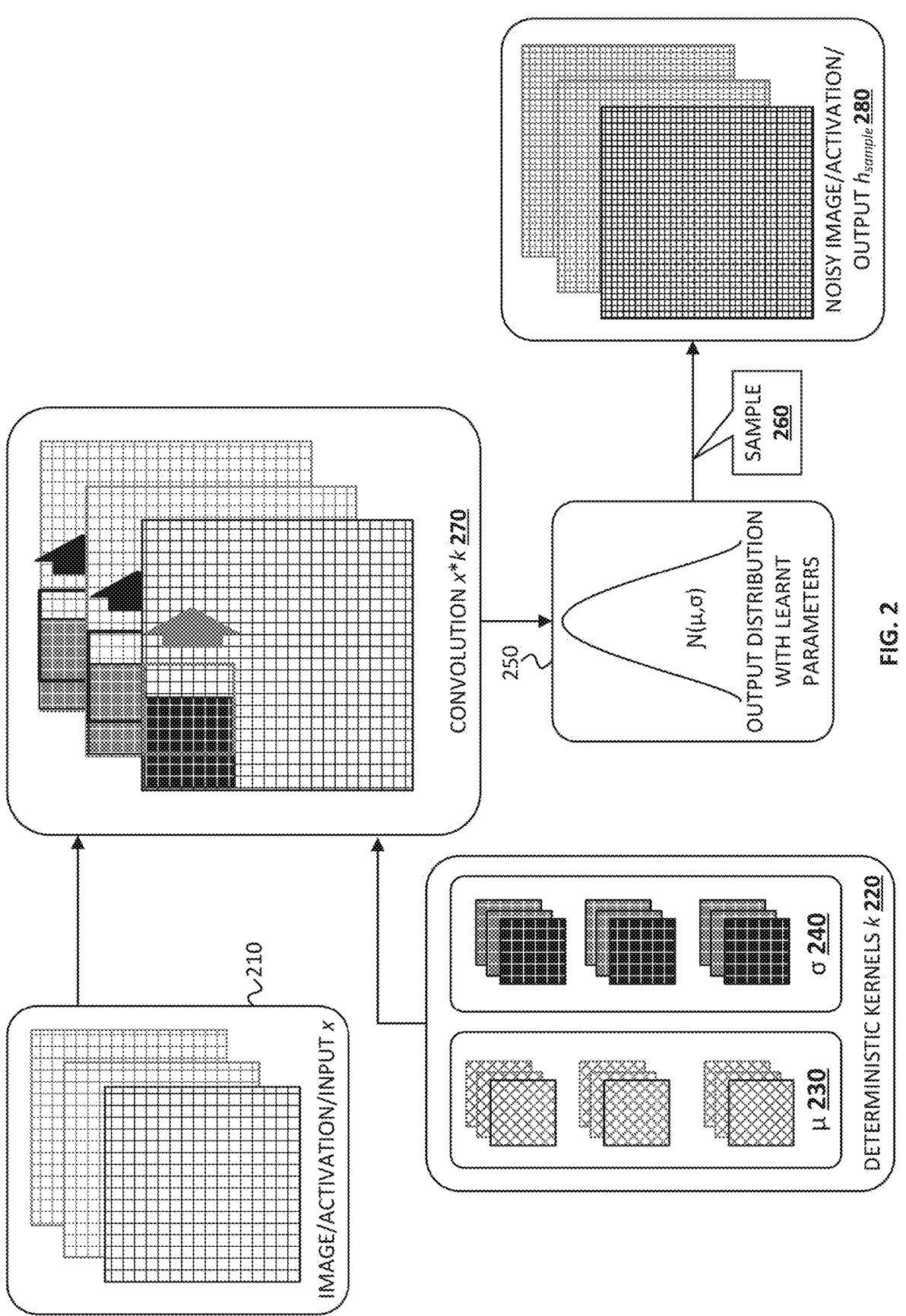
FIG. 2 depicts a convolutional stochastic layer with deterministic convolutional kernels, in accordance with some embodiments.

Two example convolutional stochastic layers are now described. FIG. 2 depicts a convolutional stochastic layer with deterministic convolutional kernels, in accordance with some embodiments. The convolutional stochastic layer can be any layer in a convolutional neural network, including an input layer, an output layer, a hidden layer, etc. The layer, in this example, receives as input inputs 210. The inputs 210 can be images, activation maps, feature maps, outputs of another layer (e.g., either a stochastic layer or non-stochastic layer). The layer may include one or more deterministic kernels 220. The deterministic kernels 220 may be initialized prior to training and may contain parameters describing one of more probability distributions, in some cases, with one probability distribution for each respective model parameter to which noise is to be applied. The deterministic kernels 220 can contain multiple parameters which describe one or more probability distributions. Each deterministic kernel 220 may include different parameter values or different parameter values for various parts of the inputs 210. In some examples, the deterministic kernels 220 may contain parameters which describe different types of probability distributions (e.g., both a Gaussian and a Laplace distribution), including a combination of probability functions.

The deterministic kernels 220 can be convolved 270 over the inputs to produce one or more parameters of a probability distribution. The probability distribution can be a Gaussian, Laplacian, binomial, multinomial, normal, etc. The probability distribution type can be selected based on the machine learning model or machine learning model application. The deterministic kernels 220 can be convolved over inputs 210 to produce output activations which are parameters of probability distributions 250. The probability distributions 250 describe a probability distribution which can be randomly sampled 260 to generate activation maps or outputs 280. The outputs 280 can act as inputs (i.e., input activations) for the next layer in the network.

In a specific example, prior to training, the deterministic kernels 220 comprise two set of kernels (referred to herein as $k_\mu$, and $k_\sigma$) initialized for two parameters (referred to herein as $\mu$ 230 and $\sigma$ 240, respectively) of a probability distribution. The probability distribution in this example is a Gaussian distribution, but the probability distribution can be any appropriate distribution as previously described. In a forward pass, the deterministic kernels 220 corresponding to $\mu$ 230 and $\sigma$ 240 (i.e., $k_\mu$, and $k_\sigma$) can be convolved on the

7 inputs 210. Probability distributions 250 can be described by μ 230 and α 240, which can be obtained using Equations 2 and 3, below:

$$\mu[m, n] = (x * k_\mu)[m, n] = \sum_i \sum_j k_\mu[i, j] \, x[m + i, n + j] \quad (2)$$

$$\sigma[m, n] = (x * k_\sigma)[m, n] = \sum_i \sum_j k_\sigma[i, j] \, x[m + i, n + j] \quad (3)$$

where $k_\mu$, and $k_\sigma$ are the kernels of μ 230 and σ 240 for the Gaussian distribution.

From the probability distribution defined by μ 230 and σ 240, activation maps or outputs 280 $h_{sample}$ can be randomly sampled 260. The random sample can be described by Equation 4, below:

$$h_{sample} \sim \mathcal{N}(\mu, \sigma) \Rightarrow h_{sample} = \mu + \sigma \cdot \epsilon; \; \epsilon \sim \mathcal{N}(0,1) \quad (4)$$

where $h_{sample}$ is a member of the probability distribution $\mathcal{N}(\mu, \sigma)$ if and only if $h_{sample} = \mu + \sigma \cdot \epsilon$ where $\epsilon$ is given by the probability distribution $\epsilon \sim \mathcal{N}(0, 1)$.

The deterministic kernels 220 can be trained in a manner similar to those used in standard convolutional neural networks. The parameters of the probability distributions 250 (i.e., μ 230 and σ 240) can be differentiable with respect to their respective the deterministic kernels 220. The randomly sampled 260 outputs 280 can be differentiable with respect to the deterministic kernels 220. Gradients of the activation maps or outputs 280 can be obtained with respect to the deterministic kernels 220. The deterministic kernels 220 can then be trained using gradients or other differentiable quantities using back-propagation, gradient descent, etc.

To continue the previous example for a Gaussian distribution, the parameters of the probability distributions 250 can be differentiable as shown in Equation 5, below:

$$\frac{d\mu}{dk_\mu}, \frac{d\sigma}{dk_\sigma}, \frac{dh_{sample}}{dk_\mu}, \frac{dh_{sample}}{dk_\sigma} \quad (5)$$

where the parameters of the probability distributions (i.e., μ 230 and σ 240) can be fully or partially differentiable with respect to the deterministic kernels 220 (i.e., $k_\mu$, and $k_\sigma$) and where activation maps or outputs 280 (i.e., $h_{sample}$) can also be fully or partially differentiable with respect to the deterministic kernels 220.

The differentials with respect to the deterministic kernels 220 can be used to train the deterministic kernels 220. Once the deterministic kernels 220 are trained, a forward pass can be performed using the trained deterministic kernels 220 to produce activation maps or outputs 280. The activation maps or outputs 280 can be used as inputs for one or more other layers in the neural network.

Figure 3:
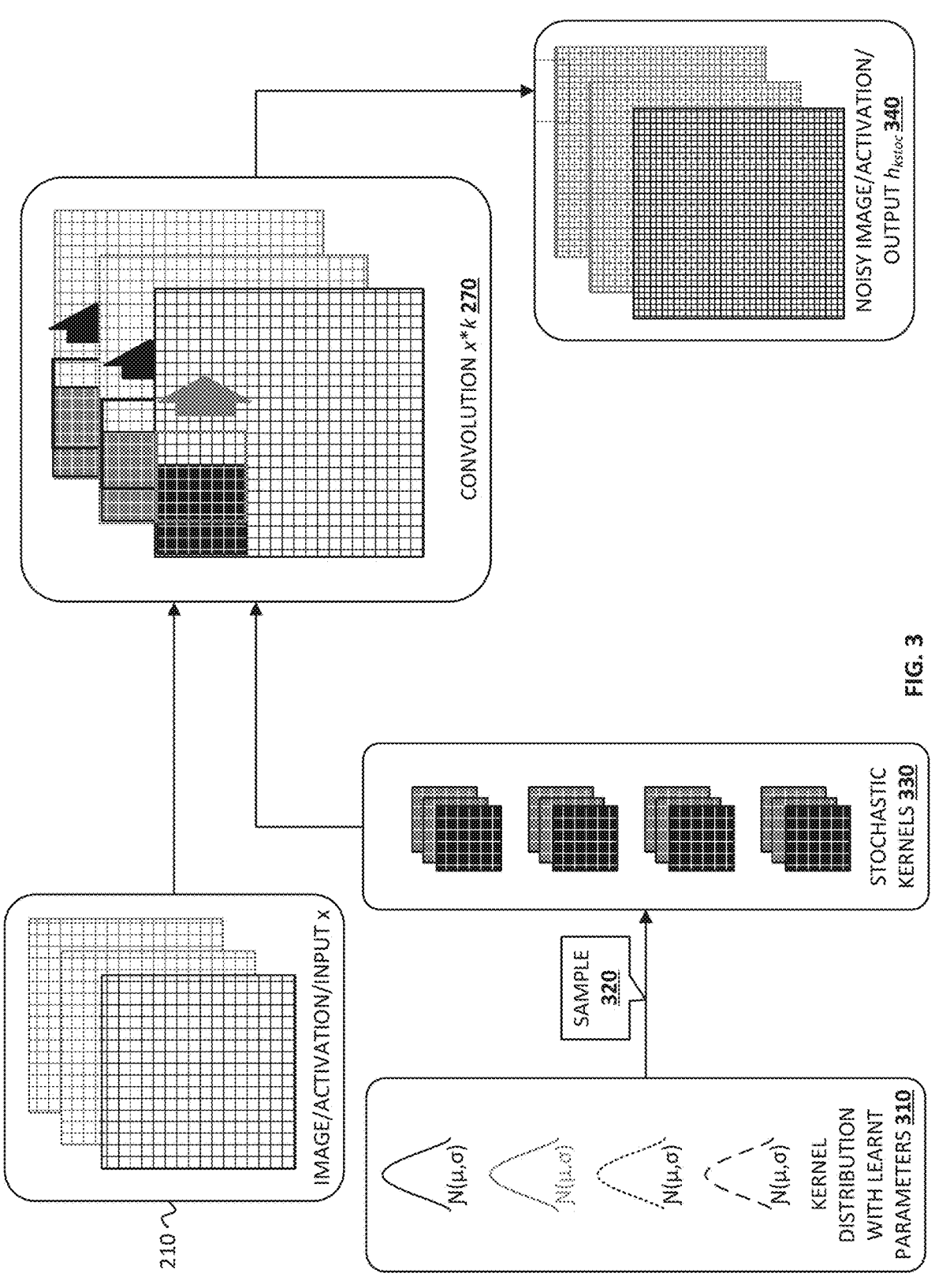
FIG. 3 depicts a stochastic layer with stochastic convolutional kernels, in accordance with some embodiments.

FIG. 3 depicts a convolutional stochastic layer with stochastic convolutional kernels, in accordance with some embodiments. In some embodiments, kernels can be represented by one or more probability distribution—i.e., kernels can correspond to a probabilistic range of values instead of being single valued. Stochasticity can be introduced in one or more stochastic layers by using kernels based on probability distributions and by learning parameters of such probability distributions.

The convolutional stochastic layer can be any layer in a convolutional neural network, including an input layer, an output layer, a hidden layer, etc. The layer receives as input inputs 210. The inputs 210 can be images, activation maps, feature maps, outputs of another layer (e.g., either a stochastic layer or non-stochastic layer). The layer comprises one or more stochastic kernels 330. The stochastic kernels 330 are drawn or selected from one or more respective probability distributions 310. The stochastic kernels 330 can comprise one or more values randomly sampled 320 from the probability distributions 310. The probability distributions 310 can be described by one or more parameters, and the parameters of the probability distributions 310 can be trainable and can be trained. The probability distributions 310 can depend on one or more parameters, and can be Gaussian, Laplacian, binomial, multinomial, normal, etc. The probability distributions 310 can contain multiple distinct probability distributions, including multiplicative or additive probability distributions, probability distributions together with input weight masks, etc. The stochastic kernels 330, which are randomly sampled from the probability distributions 310, can be convolved over the inputs 210 and can produce activation maps or outputs 340.

Parameters of the probability distributions 310, which can describe a probability distribution for each of the stochastic kernels 330, can be initialized prior to training. During a forward pass, one or more stochastic kernels 330 can be drawn from the values of the probability distributions 310. In a specific example, if a Gaussian probability distribution is used to generate the stochastic kernels 330, parameters (i.e. $\mu_{k_{stoc}}$ and $\sigma_{k_{stoc}}$) can be initialized. During the forward pass, the kernel $k_{stoc}$ can be selected or otherwise determined from each distribution. The kernel $k_{stoc}$ can be determined governed by a relationship such as that shown in Equation 6, below:

$$k_{stoc} \sim \mathcal{N}(\mu_{k_{stoc}}, \sigma_{k_{stoc}}) \Rightarrow k_{stoc} = \mu_{k_{stoc}} + \sigma_{k_{stoc}} \cdot \epsilon; \; \epsilon \sim \mathcal{N}(0, 1) \quad (6)$$

where $k_{stoc}$ is a member of the probability distribution $\mathcal{N}(\mu_{k_{stoc}}, \sigma_{k_{stoc}})$ if and only if $k_{stoc} = \mu_{k_{stoc}} + \sigma_{k_{stoc}} \cdot \epsilon$ where $\epsilon$ is given by the probability distribution $\epsilon \sim \mathcal{N}(0,1)$.

The stochastic kernels 330 can be convolved 270 over the inputs to produce activation maps or outputs 340. The convolution can be given by Equation 7, below:

$$h_{k_{stoc}}[m, n] = (x * k_{stoc})[m, n] = \sum_i \sum_j k_{stoc}[i, j] \, x[m + i, n + j] \quad (7)$$

where $k_{stoc}$ is the stochastic kernel randomly sampled 260 from the Gaussian distribution and where $h_{k_{stoc}}$ is the output of the convolution.

The parameters of the probability distributions 310, from which the stochastic kernels 330 are randomly sampled 320, can be trainable and can be trained. The activation maps or outputs of the convolution can be differentiable with respect to the stochastic kernels 330. The stochastic kernels 330 can also be differentiable with respect to the parameters of the probability distributions 310. Gradients of the activation maps or outputs 340 can be obtained with respect to the parameters of the probability distributions 310. The parameters of the probability distributions 310 can then be trained using gradients or other differentiable quantities using back-propagation, gradient descent, etc.

To continue the previous example for a Gaussian distribution, the parameters of the probability distributions 310 (i.e. $\mu_{k_{stoc}}$ and $\sigma_{k_{stoc}}$) can be differentiable as shown in Equation 5, below:

$$\frac{dk_{stoc}}{d\mu_{k_{stoc}}}, \frac{dk_{stoc}}{d\sigma_{k_{stoc}}}, \frac{dh_{k_{stoc}}}{d\mu_{k_{stoc}}}, \frac{dh_{k_{stoc}}}{d\sigma_{k_{stoc}}} \tag{8}$$

where the stochastic kernels 330 (i.e., $k_{stoc}$) can be fully or partially differentiable with respect to the parameters of the probability distributions 310 (i.e., $\mu_{k_{stoc}}$ and $\sigma_{k_{stoc}}$) and where activation maps or outputs 280 (i.e., $h_{k_{stoc}}$) is also fully or partially differentiable with respect to the parameters of the probability distributions 310.

The differentials with respect to the parameters of the probability distributions 310 can be used to train the parameters of the probability distributions. Once the parameters of the probability distributions 310 are trained, a forward pass can be performed using the trained parameters to generate stochastic kernels 330 to produce the activation maps or outputs 340 (i.e., $h_{k_{stoc}}$). The activation maps or outputs 340 can be used as inputs for one or more other layers in the neural network.

A fully connected layer in a neural network can perform an inner product between an input activation vector x and a trainable parameter vector W. The vector h that represents the activation map or output of the inner produce can be given by Equation 9, below:

$$h = W \cdot x \tag{9}$$

where h is the output which propagates forward out of the fully connected layer, W is a trainable parameter vector containing one or more weights, and x is the input or activation vector which enters the fully connected layer.

In some embodiments, a deterministic weight vector (i.e., W) can be used to produce one or more activation maps or outputs which act as parameters of one or more probability distributions. The probability distributions can depend on one or more parameters, and can be Gaussian, Laplacian, binomial, multinomial, normal, etc. The probability distributions vary for components of the input vector.

Prior to training, a deterministic weight vector can be initialized for each parameter of the probability distributions. One or more probability distributions can be selected. The probability distribution can be selected based on the model architecture, the input type, the input size, the output type, the output size, etc. During a forward pass, the deterministic weight vectors are applied to the input vector to produce activation maps or outputs corresponding to the parameters of the probability distributions. The application of the deterministic weight vector to the input vector (i.e., the inner product) generates the parameters of the probability distribution. From the activation maps or outputs, an activation map can be randomly sampled to act as an input activation for one or more subsequent layer in the network.

In a specific example, for a Gaussian probability distribution, two sets of deterministic weight vectors can be initialized—e.g., $W_\mu$, and $W_\sigma$—for the parameters of the probability distribution (i.e., $\mu$ and $\sigma$). The application of the deterministic weight vector to the input generates the parameters of the Gaussian probability distribution, as shown in Equations 10-11, below:

$$\mu = W_\mu \cdot x \tag{10}$$

$$\sigma = W_\sigma \cdot x \tag{11}$$

where x is the input vector, and $W_\mu$ and $W_\sigma$ are the deterministic weight vectors for the parameters $\mu$ and $\sigma$, respectively, of the Gaussian probability distribution. From the Gaussian probability distribution, an activation map (or output) can be sampled, such that Equation 12, below, holds:

$$h_{sample} \sim \mathcal{N}(\mu, \sigma) \Rightarrow h_{sample} = \mu + \sigma \cdot \epsilon; \ \epsilon \sim \mathcal{N}(0,1) \tag{12}$$

where $h_{sample}$ a member of the probability distribution $\mathcal{N}$ ($\mu$, $\sigma$) if and only if $h_{sample} = \mu + \sigma \cdot \epsilon$ where $\epsilon$ is given by the probability distribution $\epsilon \sim \mathcal{N}(0,1)$.

The deterministic weight vectors can be trained in a similar manner to weight vectors for fully connected layers without stochasticity. The parameters of the probability distributions can be differentiable with respect to their respective deterministic weight vectors. The activation maps or output can also be differentiable with respect to the parameters of the probability distributions. Gradients of the activation maps or outputs can also be determined with respect to the deterministic weight vectors. The weight vectors can be trainable and may be trained using gradients or other differentiable quantities using back-propagation, gradient descent, etc.

Returning to the specific example, the parameters of the probability distributions (i.e., $\mu$ and $\sigma$) and the activation maps or outputs can be differentiable as shown in Equation 13, below:

$$\frac{d\mu}{dW_\mu}, \frac{d\sigma}{dW_\sigma}, \frac{dh_{sample}}{d\mu}, \frac{dh_{sample}}{d\sigma}, \frac{dh_{sample}}{dW_\mu}, \frac{dh_{sample}}{dW_\sigma} \tag{13}$$

where the parameters of the probability distributions (i.e., $\mu$ and $\sigma$) can be fully or partially differentiable with respect to the deterministic weight vectors (i.e., $W_\mu$ and $W_\sigma$) and where activation maps or outputs (i.e., $h_{sample}$) can also be fully or partially differentiable with respect to the deterministic weight vectors and the parameters of the probability distributions.

The differentials with respect to the deterministic weight vectors can be used to train the deterministic weight vectors or weights. Once the deterministic weight vectors are trained, a forward pass can be performed using the trained deterministic weight vectors to produce activation maps or outputs. The activation maps or outputs can be used as inputs for one or more other layers in the neural network.

In some embodiments, a stochastic weight vector (i.e., W) can be used to produce one or more activation maps or outputs which act as parameters of one or more probability distributions. A stochastic weight vector can correspond to a probabilistic range of values instead of being single values. Stochasticity can be instructed in one or more stochastic layer by using weight vectors based on probability distributions and by learning parameters for such probability distributions. The value of the stochastic weight vector can be drawn from the probability distributions. The probability distributions can depend on one or more parameters, and can be Gaussian, Laplacian, binomial, multinomial, normal, etc. The probability distributions vary for components of the input vector.

Prior to training, parameters representing a probability distribution are initialized. One or more probability distribution can be selected. The probability distribution can be selected based on the model architecture, the input type, the input size, the output type, the output size, etc. During a forward pass, a weight vector is randomly sampled from the probability distributions. The inner product of the input or input activation and the weight vector generates an activation map or output.

In a specific example, for a Gaussian probability distribution, parameters $\mu_{W_{stoc}}$ and $\mu_{\sigma_{stoc}}$ can be initialized. During the forward pass, a weight vector $W_{stoc}$ can be sampled from each probability distribution such that the weight vector is given by Equation 14, below:

$$W_{stoc} \sim \mathcal{N}(\mu_{W_{stoc}}, \sigma_{W_{stoc}}) \Rightarrow W_{stoc} = \mu_{W_{stoc}} + \sigma_{W_{stoc}} \cdot \epsilon; \; \epsilon \sim \mathcal{N}(0,1) \tag{15}$$

where $W_{stoc}$ is a member of the probability distribution $\mathcal{N}(\mu_{W_{stoc}}, \mu_{\sigma_{stoc}})$ if and only if $W_{stoc} = \mu_{W_{stoc}} + \sigma_{W_{stoc}} \cdot \epsilon$ where $\epsilon$ is given by the probability distribution $\epsilon \sim \mathcal{N}(0,1)$. The application of the weight vector $W_{stoc}$ to the input generates the activation map or output as described by Equations 16, below:

$$h_{W_{stoc}} = W_{Stoc} \cdot x \tag{16}$$

where x is the input vector, and $W_{stoc}$ is the stochastic weight vector randomly sampled from the probability distribution described by the parameters $\mu_{W_{stoc}}$ and $\sigma_{W_{stoc}}$, and $h_{W_{stoc}}$ is the output or activation map produced by the fully connected stochastic layer.

The parameters of the probability distribution can be trainable. The activation or output can be differentiable with respect to the stochastic weight vector. The stochastic weight vector can be differentiable with respect to the parameters of the probability distributions. Gradients or the activation maps or outputs can be obtained with respect to the parameters of the probability distributions. The stochastic weight vector can be trainable and may be trained using gradients or other differentiable quantities using back-propagation, gradient descent, etc.

Returning to the specific example, the parameters of the probability distributions (i.e., $\mu_{W_{stoc}}$ and $\sigma_{W_{stoc}}$) and the activation maps or outputs $h_{W_{stoc}}$ can be differentiable as shown in Equation 17, below:

$$\frac{dh_{W_{stoc}}}{dW_{stoc}}, \frac{dW_{stoc}}{d\mu_{W_{stoc}}}, \frac{dW_{stoc}}{d\sigma_{W_{stoc}}}, \frac{dh_{W_{stoc}}}{d\mu_{W_{stoc}}}, \frac{dh_{W_{stoc}}}{d\sigma_{W_{stoc}}} \tag{17}$$

where the parameters of the probability distributions (i.e., $\mu_{W_{stoc}}$ and $\sigma_{W_{stoc}}$) can be Fully or partially differentiable with respect to the stochastic weight vectors (i.e., $W_{stoc}$) and where activation maps or outputs (i.e., $h_{W_{stoc}}$) can also be fully or partially differentiable with respect to the stochastic weight vectors and the parameters of the probability distributions.

The differentials with respect to the deterministic weight vectors can be used to train the stochastic weight vectors or weights. Once the stochastic weight vectors are trained, a forward pass can be performed using the trained stochastic weight vectors to produce activation maps or outputs. The activation maps or outputs can be used as inputs for one or more other layers in the neural network.

Stochastic layers, which can include convolutional stochastic layers, fully connected convolutional layers with stochastic weights, etc., can operate within a neural network. In some embodiments, a neural network N is augmented with one or more stochastic layer $S_L$ and n additional regular layers (i.e., non-stochastic layers) $L_i$ where $0 \le i \le n$. In such an arrangement, the input to the neural network N can be applied to the one or more regular layers and the one or more stochastic layer before being introduced to the neural network N. The one or more regular layers and the one or more stochastic layer can act as a preconditioner to data before it is input into the (trained or untrained) neural network N.

In some embodiments, a neural network N contains one or more stochastic layer $S_L$ and n additional regular layers (i.e., non-stochastic layers) $L_i$ where $0 \le i \le n$. The neural network N can be described as being composed of two parts or subsections, where the neural network N is the equivalent of the neural network $N_1$ followed by application of the neural network $N_2$. In such a case, the output $O_1$ can be defined as the output of applying $N_1$ to x. The output $O_2$ can be defined as the output of applying the one or more non-stochastic layers $L_i$ to x. The outputs $O_1$ and $O_2$ can then be merged, and the merged results passed through the one or more stochastic layer $S_L$. The outputs the stochastic layer can then be passed through the neural network $N_2$. In an alternatively, the output $O_2$ can be passed thought the one or more stochastic layer $S_i$, and then the results of the one or more stochastic layer $S_L$ can be merged with the results of the output $O_1$ and the results passed through the neural network $N_2$.

Application of stochastic noise to a model can protect the model from model extraction or model stealing attacks. Use of stochastic noise can affect the model performance, where more noise can decrease the effectiveness of the model, but any degradation of model performance attributable to stochastic noise application can be expected to be balanced by a gain in model security for an optimized stochastic noise layer. An optimization function, which can be a loss function or a gain function as a loss function can be converted to a gain function by multiplication by negative one, can be defined for a neural network or other machine learning model. In some embodiments, the optimization function can be used to tune the relationship between model performance and stochastic noise-based model protection.

A loss function can be defined as $\mathcal{L}(X; W)$ for a neural network where X represents the inputs to the neural network and W represents a vector of the weights of the neural network. Stochastic noise can be added to the neural network by a perturbation of the weights of the vector W to create a vector W+N where N represents a zero-mean additive noise vector. The noise vector N can be any appropriate probability distribution. The noise vector N has a covariance matrix Σ. If the weight vector W is perturbed to W+N, this is equivalent to sampling weights from a distribution with the mean of W and the variance of Σ. In order to train the noise model, the covariance matrix Σ can be selected or trained to minimize an optimization function, where the optimization function can be given by Equation 18, below:

$$\Sigma_\alpha^* = \min_\Sigma (1 - \alpha) \mathcal{L}(X; W + N) - \alpha \log(\|\Sigma\|) \tag{18}$$

where $\|\Sigma\|$ is the determinant of the covariance matrix Σ of the noise matrix N, $\mathcal{L}(X; W+N)$ is the loss function for the perturbed neural network, and where $\alpha \in (0,1)$ (i.e., α is an element between zero and one) and α is a hyper-parameter that determines how much emphasis is given to applying noise (i.e., protecting the model) versus preserving the model's performance.

A machine learning model's susceptibility to adversarial attacks is generally unknown. Machine-learning practitioners typically do not have a way to quantify whether a model is easy or difficult to attack with the various types of adversarial attacks: evasion attacks, poisoning attacks, model extraction attacks, inference attacks, etc. As such, it can be difficult to rely on machine learning systems in critical systems or know how to modify machine learning models to make them more robust to such attacks.

To mitigate these issues, some embodiments quantify the minimum perturbation to a correctly processed (e.g., classified, predicted, etc. in response to) input to a model that will cause the model to fail. Contemplated herein is a technical solution of a vulnerability analysis or analyses formulated as a gradient based optimization (using a differentiable objective function, which renders many use cases computationally feasible that might otherwise not be) defined as a loss function (which can instead be a generalized optimization function or a gain function) over a pre-trained machine learning model being measured for susceptibility to adversarial attacks. The outcome may be a loss defined as a minimum perturbation that causes a maximum misclassification. The loss may be determined to find a maximum misclassification, caused by a smallest perturbation without changing weights within the layer of the machine learning model. Some embodiments of the technical solutions contemplated herein may be agnostically applied to various neural network models, such as neural networks operating on image data, audio data, or text for natural language processing.

Some embodiments measure a pre-trained neural network's susceptibility to adversarial attacks and output a corresponding metric. To this end, some embodiments determine a minimum perturbation that would cause an input misclassification. For example, a tensor of random samples from a normal distribution (or one or more other distributions including but not limited to e.g., Gaussian, Laplacian, binomial and multinomial distributions) may be added to the input tensor X to determine a minimum variance value to the loss function of the neural network.

Reference to "minimums" and "maximums" should not be read as limited to finding these values with absolute precision and includes approximating these values within ranges that are suitable for the use case and adopted by practitioners in the field. It is generally not feasible to compute "minimums" or "maximums" to an infinite number of significant digits and spurious claim construction arguments to this effect should be rejected.

One of the well-known forms of attacks are adversarial attacks, where the attacker, which may be malevolent, aims to alter or provide inputs to the model in such a way that the model makes a mistake. Although adversarial attacks are discussed in detail, embodiments are also applicable to determination of vulnerability to other types of attacks. Usually, these attacks are performed by adding imperceptible changes to ordinary inputs. In some cases, adversarial attacks can be unintentional—i.e., an input can be altered by noise or otherwise degraded such that the model makes a mistake where the degradation is not produced by a coordinated malevolent actor. Adversarial attacks can be generic—that is they can be designed to overwhelm the model and degrade its overall performance. For example, a chat bot can be trained to respond with nonsensical phrases based on nonsensical inputs. Adversarial attacks can also be biased or targeted towards a specific outcome. For example, a classifier which classifies images as corresponding to dog or cats can be biased to only identify cats based on a distorted training set. Other types of adversarial attacks can exist, and as malevolent actors continue to produce adversarial attack innovations additional adversarial attack classes can be envisioned.

The vulnerability of the trained model to adversarial attacks and/or other input corruption can be an important measure of the robustness of the model and can be leveraged to determine how closely input should be guarded and/or filtered, to determine a deployment strategy, to determine how often or when the model is tested, etc. A measure of vulnerability or susceptibility for a model can be determined based on a determination of the minimum or smallest change to the input which causes a change in the output—where the change in the output is therefore a mistaken output and/or classification. The measure of vulnerability can be a tensor or otherwise have a variable value for different elements of the input tensor. The measure of vulnerability can be a tensor which contains various distributions or a tensor which contains distribution parameters for each of the components of the input tensor or matrix. The measure of vulnerability can be a local measure of vulnerability or an input specific measure of vulnerability, for example if the minimization and/or loss function optimization has a local minimum. The measure of vulnerability can be a global (or pseudo or quasi-global) measure of vulnerability, particularly if the loss function is convex and a global minimum can be obtained for the loss function.

To determine how vulnerable a neural network, or optionally another model, is to adversarial attacks, a minimum distortion to the input is determined for which the minimum distortion alters the output of the neural network. The measure of vulnerability can be calculated based on a gradient-based optimization problem for a loss function for a trained machine learning model This problem of vulnerability analysis can be formulated as a gradient-based optimization problem that is defined as a loss function over a pre-trained machine learning model. This loss is defined as finding the minimum perturbation (noise) over the input to the model that causes maximum mistakes in the objective of the model without changing its parameters. For instance, find the minimum perturbation that causes maximum misclassification without changing the weights of the model. Those some embodiments are described in detail with respect to neural network models, the vulnerability analysis is not limited to any specific type of neural network or data type. For instance, it can be applied on neural networks that operate on image data for vision tasks. Or it can be applied to neural networks that process text of an email to detect whether or not it is spam. These are just examples of use-cases and the technique is general.

In some embodiments, a loss function (which can instead be a gain function or an optimization function) can be defined for a pretrained neural network. For a neural network, the input can be represented by an input tensor X and the weights can be represented by a weight tensor W. In some embodiments, it can be assumed that perturbation or noise is added to the input tensor X For example, the perturbation can be a tensor where the tensor elements are parameters of one or more probability distribution. In a specific example, the noise can be randomly sampled from a normal distribution, which can be represented as $N(\mu^{\Phi}, \sigma^{\Phi})$. In this example, the perturbation tensor can be a tensor with the dimensions of the input tensor X The elements of the perturbation tensor can be probability distribution parameters, such as $(0, 0)$, which represent a normal distribution, such as $N^{\circ}(\mu^{\Phi}, \sigma^{\Phi})$. Alternatively, the perturbation tensor can have different dimensions than the input tensor X For example, the perturbation tensor can be applied to the input tensor X multiple times or in specific regions.

In order to determine a vulnerability analysis, the minimum perturbation (i.e., minimum $\mu$ and minimum $\sigma$) for which a tensor of random samples drawn from the distributions defined by the minimum perturbation parameters and added to the input tensor X leads to misclassification is determined. For simplicity, the mean of the probability distribution can be set to zero (i.e., $\mu=0$) in an example case. The mean of the probability distribution can be non-zero, and further the probability distribution can be non-symmetric. In the mean of the probability distribution is zero, then the minimum perturbation is given by the minimum standard deviation (i.e., min $\sigma$). In order to find the minimum $\sigma$, a noise or perturbed input tensor can be generated for which an additive noise vector with a covariance matrix of $\Sigma$ is injected. The perturbed input tensor can be given by $\tilde{X}=X+N$, where N is the noise vector which has a covariance matrix of $\Sigma$. Then the minimum noise can be found for a vulnerability analysis based on an optimization of the covariance matrix E, such as that described in Equation 19, below:

$$\Sigma_\alpha^- = \min_{\Sigma} - (1-\alpha)\mathcal{L}(X_N; W) - \alpha \log(\|\Sigma\|) \qquad (19)$$

where $\|\Sigma\|$ is the determinant of the covariance matrix $\Sigma$ of the noise matrix N. $X_N$ represents the input (i.e., the input tensor X) plus the noise samples drawn from the probability distributions contained within the noise tensor N. $\alpha \in (0,1)$ and a is a hyper-parameter that determines how much emphasis is given to the perturbations (i.e., $\|\Sigma\|$) versus the degradation of the network performance represented by the loss function of the neural network with perturbed inputs $\mathcal{L}(X_N; W+N)$. The networks susceptibility to adversarial attacks is given by the low variance noise $\Sigma_\alpha^-$, where the noise degrades the neural network performance significantly.

Traditionally, the variance could be determined by minimizing the objective function described by Equation 19. However, $\Sigma=0$ is a universal minimizer for the optimization of Equation 19, where the second term of the objective function approaches negative infinity when $\Sigma=0$ (i.e., $-\alpha \log(\|\Sigma\|) \to -\infty$ as $\Sigma \to 0$). In order to produce values with are expected to be useful for vulnerability analysis, the second term of the objective function can be replaced with a function that is lower bounded but displays similar behavior to $\Sigma$. In some embodiments, $\log(\|\Sigma\|)$ can be replaced by $\log(\|I+\Sigma\|)$, where I can be the identify matrix. Equation 19 can then be converted to Equation 20, below:

$$\Sigma_\alpha^- = \min_{\Sigma} - (1-\alpha)\mathcal{L}(X_N; W) - \alpha \log(\|I+\Sigma\|) \qquad (20)$$

If the elements of the noise vector are independent—i.e., if $\Sigma$ is a diagonal matrix—with standard deviations $\{\sigma_1, \ldots, \sigma_n\}$, then the objective function of Equation 20 can be written as given by Equation 21, below:

$$\Sigma_{\hat\alpha}^- = \min_{\Sigma} - (1-\hat\alpha)\mathcal{L}(X_N; W) - \hat\alpha \sum_{i=1}^{n} \log(1+\sigma_i) \qquad (20)$$

which can be used to find the minimum noise variance which cause the maximum degradation of accuracy of the pre-trained neural network.

The differentiability of this formulation is one of the most important contributions. Because of this characteristic, gradient descent algorithms (e.g., stochastic gradient descent) can be used to find the perturbations (i.e., $\sigma$s) which give the minimum perturbation which produce the maximum misclassification. This class of algorithms are conventionally used to train neural networks and discover the weights.

However, here the neural network can eb pre-trained and the weight parameters are already known. Therefore, in this optimization, the gradients can be calculated instead with respect to the perturbations (i.e., $\sigma$s) that leads to the discovery of the minimal noise.

In another embodiment, the formulation can be changed in such a way that inputs that belong to a specific class or a group of classes, to be forced to classified as a specific wrong class. As an example, all the phishing emails can be forced to be classified as normal emails. In this way a minimum biased noise or local noise minimum can be determined. The inputs can have more than one classification. For example, phishing emails can be forced to be classified as normal emails while bulk email classification is unaffected. In another example, multiple classes can be forced to be classified as a specific wrong class or as any wrong class. For example, all emails (e.g., phishing emails, bulk emails, etc.) can be classified as normal emails.

In another incarnation, the perturbations can be applied to the intermediate representations or the layers of the machine learning model.

Additionally, a vulnerability analysis can provide information about the layers of the model and the relative importance of the input. Areas of the tensor for which the noise minimum are greater can represent areas of the input tensor or the layer which are less important to the machine learning model. The vulnerability analysis can be used to reduce dimensionality in a model, if various parameters are determined to have little effect on output (i.e., are able to have high noise or regularization applied).

Figure 4:
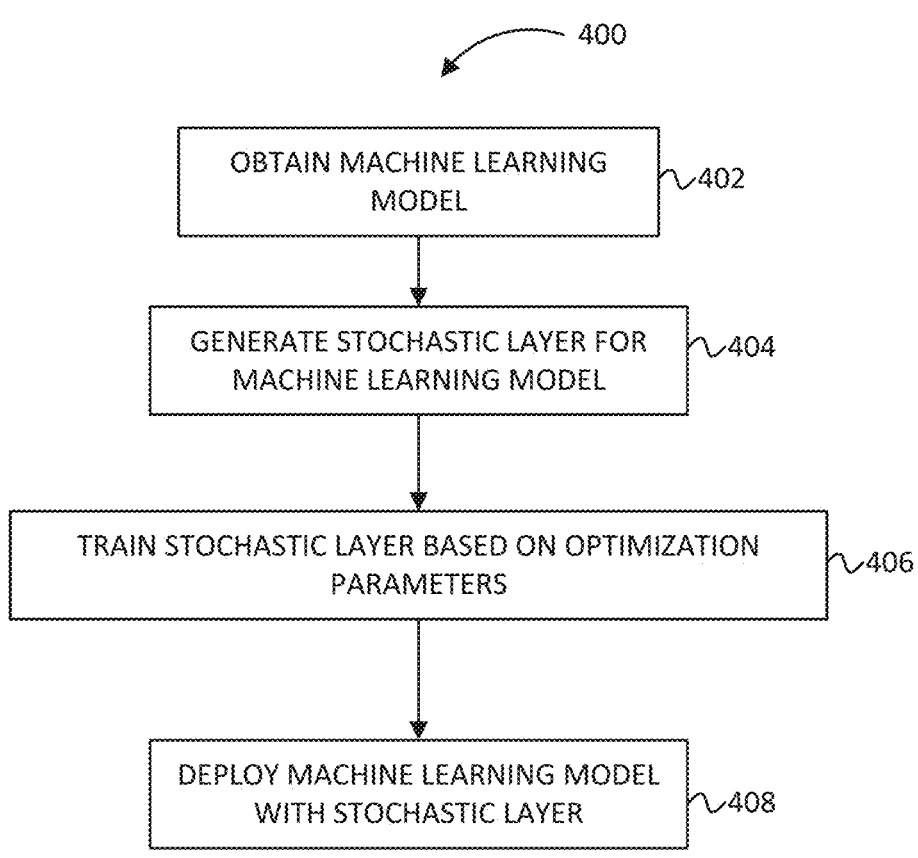
FIG. 4 illustrates an exemplary method for application of a stochastic layer to a machine learning model, according to some embodiments.

FIG. 4 illustrates an exemplary method 400 for application of a stochastic layer to a machine learning model, according to some embodiments. Each of these operations is described in detail below. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting. In some embodiments, one or more portions of method 400 may be implemented (e.g., by simulation, modeling, etc.) in one or more processing devices (e.g., one or more processors). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400, for example. For illustrative purposes, optional operations are depicted with dashed lines. However, operations which are shown with unbroken lines can also be optional or can be omitted.

At an operation 402, a machine learning model is obtained. The machine learning model can be trained (i.e., defined by both hyperparameters and parameters) or untrained (i.e., defined by hyperparameters with unknown parameters). The machine learning model can be an appropriate type of machine learning model, including a neural network, a convolutional neural network, etc. and can contain any appropriate arrangement of layers, inputs, and outputs.

At an operation 404, a stochastic layer is generated for the machine learning model. The stochastic layer can operate on input to a layer, output of a layer, weights of a layer, etc. The stochastic layer can be a layer existing in the machine learning model—i.e., an existing layer can be converted to a stochastic layer. The stochastic layer can be an additional layer added to the machine learning model.

At an operation 406, the stochastic layer is trained based on optimization parameters. The optimization parameters can be any of those optimization parameters previously described, including gradient descent, back propagation, etc. The stochastic layer can be trained until a training criteria is satisfied, which can be a time limit, a number of iterations, a loss function, etc. If the machine learning model is untrained, the stochastic layer can be trained during the training of the machine learning model.

At an operation 408, the machine learning model with the stochastic layer is deployed. The machine learning model can be stored in data storage, deployed to software or web or cloud-based applications, etc. The machine learning model As described above, method 400 (and/or the other methods and systems described herein) is configured to provide a generic framework for application of a stochastic layer to a machine learning model. The machine learning model can undergo continuous training, in which can the stochastic layer can also undergo continuous training or updating.

Figure 5:
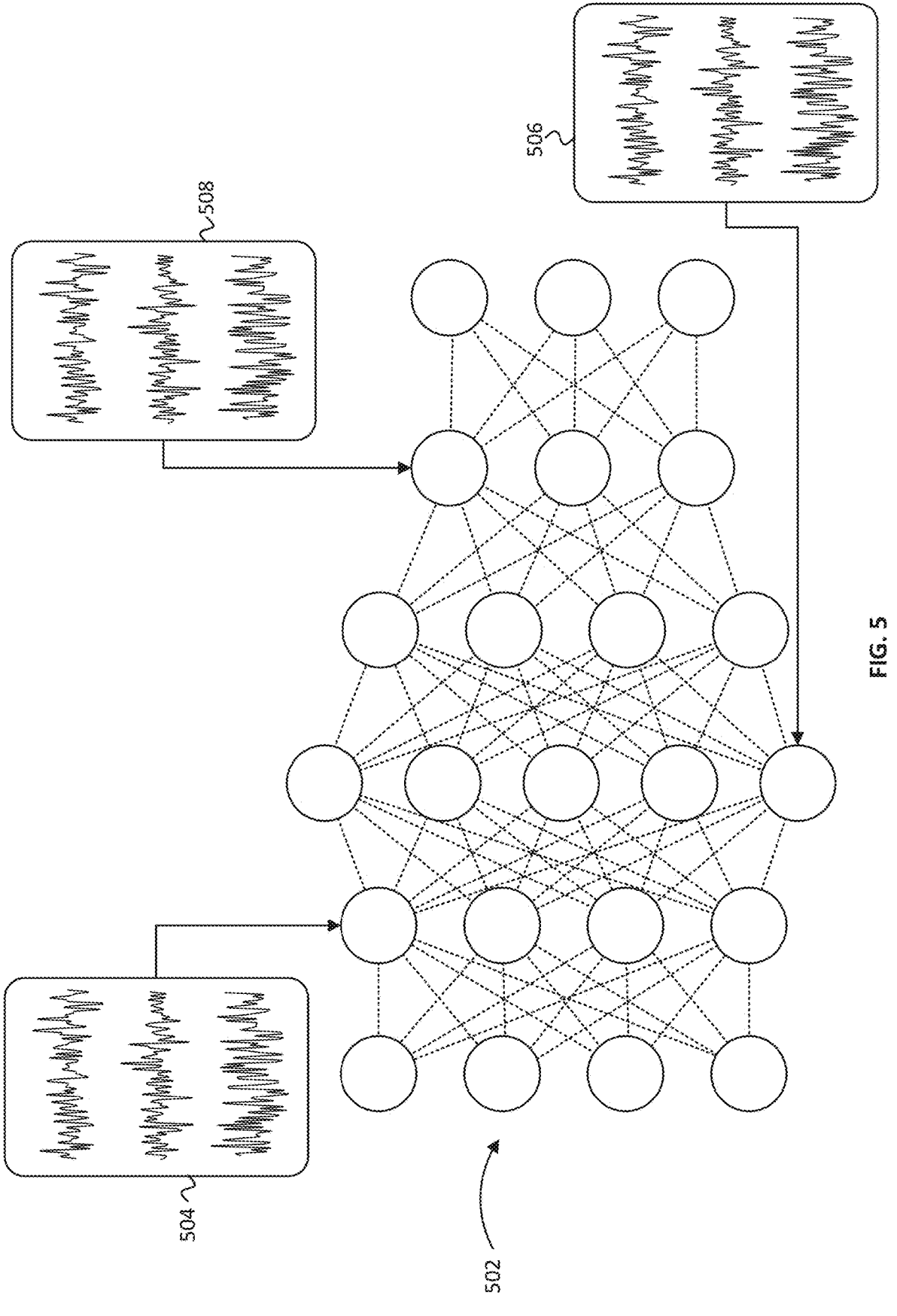
FIG. 5 illustrates a machine learning model with stochastic layer weights, according to some embodiments.

FIG. 5 illustrates a machine learning model with stochastic layer weights, according to some embodiments. FIG. 5 depicts a trained machine learning model 502, which is comprises of an input layer, multiple hidden layers, and an output layer. In order to protect or otherwise obfuscate the parameters of the model, various perturbations 504, 506, 508 are applied to the weights of several of the hidden layers. The perturbations can be selected from different probability distributions and can be randomly sampled from the probability distributions over time (i.e., every so many inputs, every input, faster than every input or otherwise preemptively). The perturbations act noise within the layer weights and make the relationship between input and output harder to determine.

Figure 6:
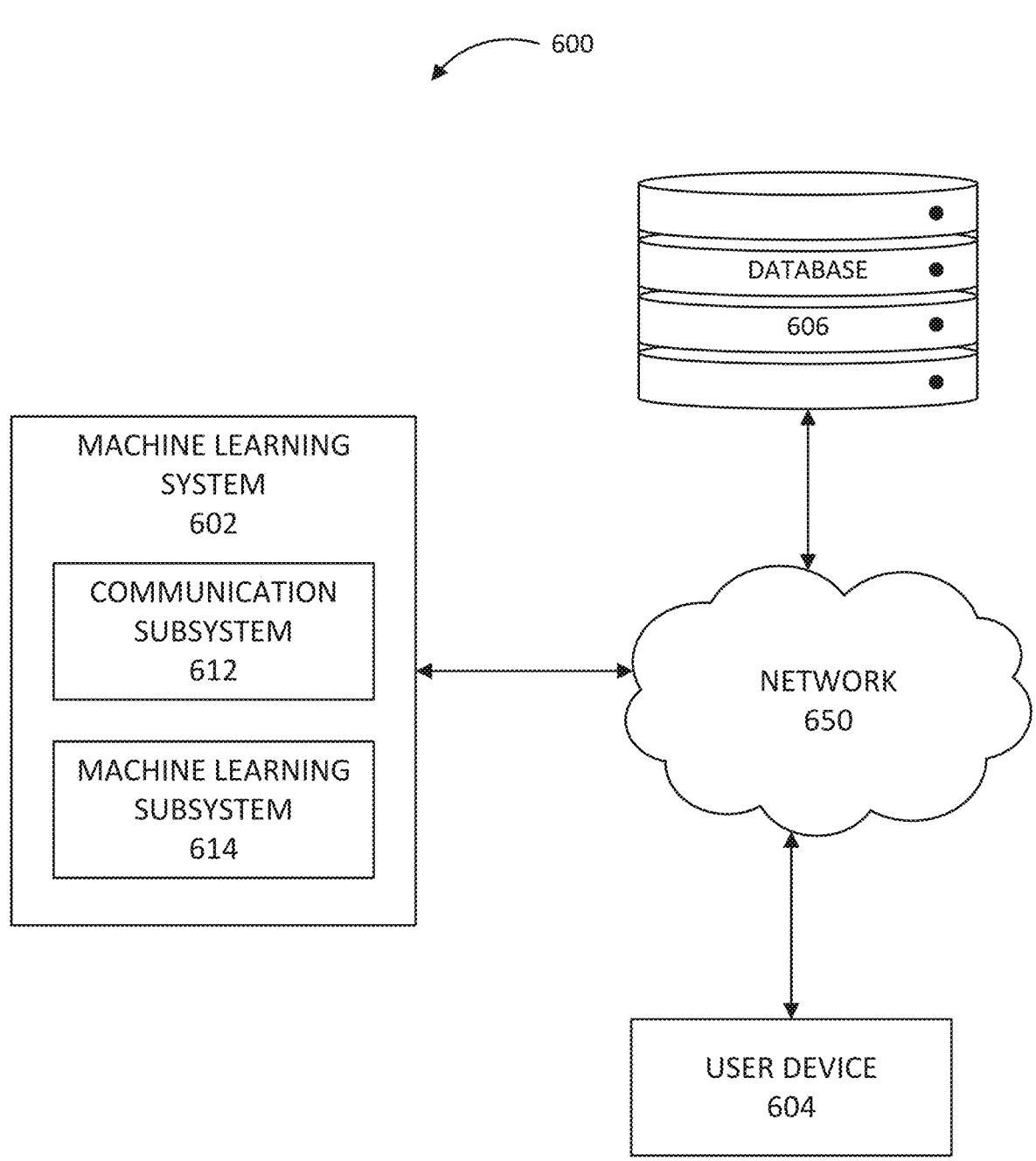
FIG. 6 shows an example computing system that uses a stochastic layer in a machine learning model, in accordance with some embodiments.

FIG. 6 shows an example computing system 600 for implementing stochastic layers in machine learning models. The computing system 600 may include a machine learning (ML) system 602, a user device 604, and a database 606. The ML system 602 may include a communication subsystem 612, and a machine learning (ML) subsystem 614. The communication subsystem 612 may retrieve one or more datasets from the database 606 for use in training or performing inference via the ML subsystem 614 (e.g., using one or more machine-learning models described in connection with FIG. 7).

One or more machine learning models used (e.g., for training or inference) by the ML subsystem 614 may include one or more stochastic layers. A stochastic layer may receive input from a previous layer (e.g., in a neural network or other machine learning model) and output data to subsequent layers, for example, in a forward pass of a machine learning model. A stochastic layer may take first data as input and perform one or more operations on the first data to generate second data. For example, the stochastic layer may be a stochastic convolutional layer with a first filter that corresponds to the mean of a normal distribution and a second filter that corresponds to the standard deviation of the normal distribution. The second data may be used as parameters of a distribution (e.g., or may be used to define parameters of a distribution). For example, the second data may include data (e.g., data indicating the mean of the normal distribution) that is generated by convolving the first filter over an input image. In this example, the second data may include data (e.g., data indicating the standard deviation of the normal distribution) that is generated by convolving the second filter over the input image.

One or more values may be sampled from the distribution. The one or more values may be used as input to a subsequent layer (e.g., the next layer following the stochastic layer in a neural network). For example, the mean generated via the first filter and the standard deviation generated via the second filter (e.g., as discussed above) may be used to sample one or more values. The one or more values may be used as input into a subsequent layer. The subsequent layer may be a stochastic layer (e.g., a stochastic convolution layer, stochastic fully-connected layer, stochastic activation layer, stochastic pooling layer, stochastic batch normalization layer, stochastic embedding layer, or a variety of other stochastic layers) or a non-stochastic layer (e.g., convolution, fully-connected, activation, pooling, batch normalization, embedding, or a variety of other layers).

A stochastic layer or one or more parameters of a stochastic layer may be trained via gradient descent (e.g., stochastic gradient descent) and backpropagation, or a variety of other training methods. One or more parameters may be trained, for example, because the one or more parameters are differentiable with respect to one or more other parameters of the machine learning model. For example, the mean of the normal distribution may be differentiable with respect to the first filter (e.g., or vice versa). As an additional example, the standard deviation may be differentiable with respect to the second filter (e.g., or vice versa).

In some embodiments, one or more parameters of a stochastic layer may be represented by a probability distribution. For example, a filter in a stochastic convolution layer may be represented by a probability distribution. The ML subsystem 614 may generate a parameter (e.g., a filter or any other parameter) of a stochastic layer by sampling from a corresponding probability distribution.

In some embodiments, the neural network may include one or more non-stochastic layers upstream of one or more stochastic layers. In some embodiments, the non-stochastic layers may be placed before (e.g., upstream in a connection graph) or after (e.g., downstream) a stochastic layer. For example, a neural network may include an input layer followed by one or more non-stochastic layers. The one or more non-stochastic layers may be followed by a stochastic layer (e.g., output from the one or more non-stochastic layers may be input into a stochastic layer). Output from the stochastic layer may be input into a second neural network or additional non-stochastic layers (e.g., the second neural network may include one or more additional non-stochastic layers).

In some embodiments, input data may be passed through a first portion (e.g., one or more layers) of a neural network to generate first output. The input data may also be passed through one or more non-stochastic layers (e.g., non-stochastic layers that are not part of the neural network that was used to generate the first output) to generate second output. The first output and the second output may be merged (e.g., concatenated, averaged, etc.) to generate merged output. The merged output may be input into a stochastic layer and the resulting output (e.g., activations) of the stochastic layer may be input into a second portion of the neural network. Alternatively, the second output may be used as input into the stochastic layer to generate additional output. The additional output may be merged (e.g., concatenated, averaged, etc.) with the first output and the resulting merged output may be input into the second portion of the neural network.

The user device 604 may be a variety of different types of computing devices, including, but not limited to (which is not to suggest that other lists are limiting), a laptop computer, a tablet computer, a hand-held computer, smartphone, other computer equipment (e.g., a server or virtual server), including "smart," wireless, wearable, Internet of Things device, or mobile devices. The user device 604 may be any device used by a healthcare professional (e.g., a mobile phone, a desktop computer used by healthcare professionals at a medical facility, etc.). The user device 604 may send commands to the ML system 602 (e.g., to train a machine-learning model, perform inference, etc.). Although only one user device 604 is shown, the system 600 may include any number of client devices.

The ML system 602 may include one or more computing devices described above and may include any type of mobile terminal, fixed terminal, or other device. For example, the ML system 602 may be implemented as a cloud computing system and may feature one or more component devices. Users may, for example, utilize one or more other devices to interact with devices, one or more servers, or other components of system 600. In some embodiments, operations described herein as being performed by particular components of the system 600, may be performed by other components of the system 600 (which is not to suggest that other features are not also amenable to variation). As an example, while one or more operations are described herein as being performed by components of the ML system 602, those operations may be performed by components of the user device 604 or database 606. In some embodiments, the various computers and systems described herein may include one or more computing devices that are programmed to perform the described functions. In some embodiments, multiple users may interact with system 600. For example, a first user and a second user may interact with the ML system 602 using two different user devices.

One or more components of the ML system 602, user device 604, and database 606, may receive content and other data via input/output (hereinafter "I/O") paths. The one or more components of the ML system 602, the user device 604, and/or the database 606 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the ML system 602, the user device 604, and the database 606 may have neither user input interface nor displays and may instead receive and display content using another device (e.g., a dedicated display device such as a computer screen and/or a dedicated input device such as a remote control, mouse, voice input, etc.). Additionally, the devices in system 600 may run an application (or another suitable program). The application may cause the processors and other control circuitry to perform operations related to weighting training data (e.g., to increase the efficiency of training and performance of one or more machine-learning models described herein).

One or more components or devices in the system 600 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically, magnetically, or optically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 6 also includes a network 650. The network 650 may be the Internet, a mobile phone network, a mobile voice or data network (e.g., a 5G or LTE network), a cable network, a public switched telephone network, a combination of these networks, or other types of communications networks or combinations of communications networks. The devices in FIG. 6 (e.g., ML system 602, the user device 604, and/or the database 606) may communicate (e.g., with each other or other computing systems not shown in FIG. 1) via the network 650 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 6 may include additional communication paths linking hardware, software, and/or firmware components operating together. For example, the ML system 602, any component of the ML system 602 (e.g., the communication subsystem 612 or the ML subsystem 614), the user device 604, and/or the database 606 may be implemented by one or more computing platforms.

Figure 7:
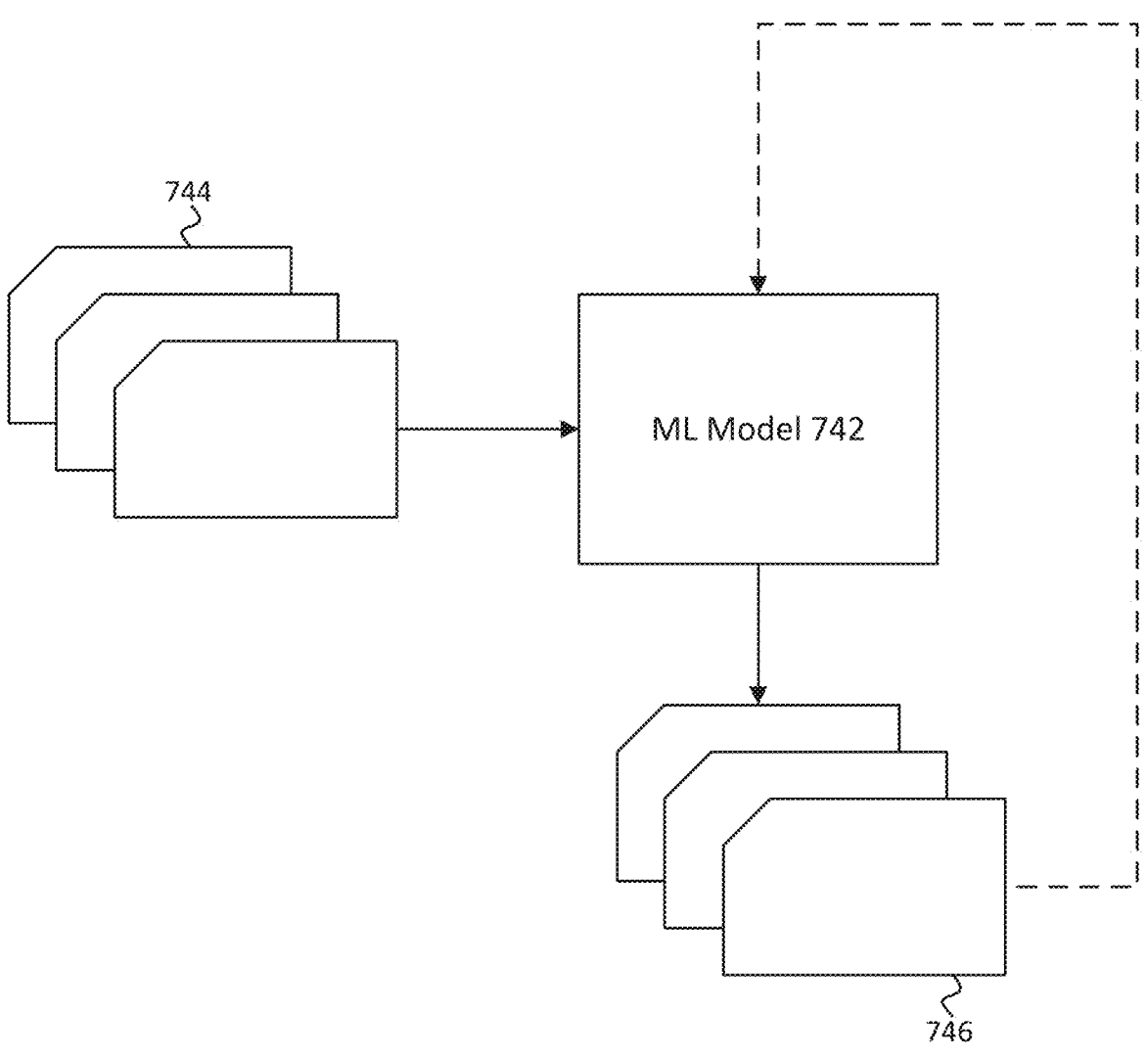
FIG. 7 shows an example machine-learning model that may use one or more stochastic layers.

One or more machine-learning models that are discussed above (e.g., in connection with any of FIG. 1-6) may be implemented, for example, as shown in FIG. 7. With respect to FIG. 7, machine-learning model 742 may take inputs 744 and provide outputs 746.

In some use cases, outputs 746 may be fed back to machine-learning model 742 as input to train machine-learning model 742 (e.g., alone or in conjunction with user indications of the accuracy of outputs 746, labels associated with the inputs, or with other reference feedback and/or performance metric information). In another use case, machine-learning model 742 may update its configurations (e.g., weights, biases, or other parameters) based on its assessment of its prediction (e.g., outputs 746) and reference feedback information (e.g., user indication of accuracy, reference labels, or other information). In another example use case, where machine-learning model 742 is a neural network and connection weights may be adjusted to reconcile differences between the neural network's output and the reference feedback. In some use cases, one or more perceptrons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine-learning model 742 may be trained to generate results (e.g., response time predictions, sentiment identifiers, urgency levels, etc.) with better recall, accuracy, or precision.

In some embodiments, the machine-learning model 742 may include an artificial neural network ("neural network" herein for short). In such embodiments, machine-learning model 742 may include an input layer (e.g., a stochastic layer as described in connection with any of FIG. 1-6) and one or more hidden layers (e.g., a stochastic layer as described in connection with FIG. 1). Each neural unit of the machine-learning model may be connected with one or more other neural units of the machine-learning model 742. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine-learning model 742 may be self-learning (e.g., trained), rather than explicitly programmed, and may perform significantly better in certain areas of problem solving, as compared to computer programs that do not use machine learning. During training, an output layer (e.g., a stochastic layer as described in connection with any of FIG. 1-6) of the machine-learning model 742 may correspond to a classification, and an input (e.g., any of the data or features described in the machine learning specification above) known to correspond to that classification may be input into an input layer of machine-learning model during training. During testing, an input without a known classification may be input into the input layer, and a determined classification may be output. The machine-learning model 742 trained by the ML subsystem 614 may include one or more embedding layers (e.g., a stochastic layer as described in connection with FIG. 1) at which information or data (e.g., any data or information discussed above in connection with the machine learning specification) is converted into one or more vector representations. The one or more vector representations of the message may be pooled at one or more subsequent layers (e.g., a stochastic layer as described in connection with any of FIG. 1-6) to convert the one or more vector representations into a single vector representation.

The machine-learning model 742 may be structured as a factorization machine model. The machine-learning model 742 may be a non-linear model and/or (use of which should not be read to suggest that other uses of "or" mean "xor") supervised learning model that can perform classification and/or regression. For example, the machine-learning model 742 may be a general-purpose supervised learning algorithm that the system uses for both classification and regression tasks. Alternatively, the machine-learning model 742 may include a Bayesian model configured to perform variational inference given any of the inputs 744. The machine-learning model 742 may be implemented as a decision tree, as an ensemble model (e.g., using random forest, bagging, adaptive booster, gradient boost, XGBoost, etc.), or any other machine-learning model.

The machine-learning model 742 may be a reinforcement learning model. The machine-learning model 742 may take as input any of the features described above (e.g., in connection with the machine learning specification) and may output a recommended action to perform. The machine-learning model may implement a reinforcement learning policy that includes a set of actions, a set of rewards, and/or a state.

The reinforcement learning policy may include a reward set (e.g., value set) that indicates the rewards that the machine-learning model obtains (e.g., as the result of the sequence of multiple actions). The reinforcement learning policy may include a state that indicates the environment or state that the machine-learning model is operating in. The machine-learning model may output a selection of an action based on the current state and/or previous states. The state may be updated at a predetermined frequency (e.g., every second, every 2 hours, or a variety of other frequencies). The machine-learning model may output an action in response to each update of the state. For example, if the state is updated at the beginning of each day, the machine-learning model 742 may output an action to take based on the action set and/or one or more weights that have been trained/adjusted in the machine-learning model 742. The state may include any of the features described in connection with the machine learning specification above. The machine-learning model 742 may include a Q-learning network (e.g., a deep Q-learning network) that implements the reinforcement learning policy described above.

In some embodiments, the machine-learning models may include a Bayesian network, such as a dynamic Bayesian network trained with Baum-Welch or the Viterbi algorithm. Other models may also be used to account for the acquisition of information over time to predict future events, e.g., various recurrent neural networks, like long-short-term memory models trained on gradient descent after loop unrolling, reinforcement learning models, and time-series transformer architectures with multi-headed attention. In some embodiments, some or all of the weights or coefficients of models described herein may be calculated by executing a machine learning algorithm on a training set of historical data. Some embodiments may execute a gradient descent optimization to determine model parameter values. Some embodiments may construct the model by, for example, assigning randomly selected weights; calculating an error amount with which the model describes the historical data and rates of change in that error as a function of the weights in the model in the vicinity of the current weight (e.g., a derivative, or local slope); and incrementing the weights in a downward (or error reducing) direction. In some cases, these steps may be iteratively repeated until a change in error between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. Other embodiments may iteratively adjust other machine learning models to reduce the error function, e.g., with a greedy algorithm that optimizes for the current iteration. The resulting, trained model, e.g., a vector of weights or thresholds, may be stored in memory and later retrieved for application to new calculations on newly calculated aggregate estimates.

In some cases, the amount of training data may be relatively sparse. This may make certain models less suitable than others. In such cases, some embodiments may use a triplet loss network or Siamese networks to compute similarity between out-of-sample records and example records in a training set, e.g., determining based on cosine distance, Manhattan distance, or Euclidian distance of corresponding vectors in an encoding space (e.g., with more than 5 dimensions, such as more than 50).

Run time may process inputs outside of a training set and may be different from training time, except for in use cases like active learning. Random selection includes pseudorandom selections. In some cases, the neural network may be relatively large, and the portion that is non-deterministic may be a relatively small portion. The neural network may have more than 10, 50, or 500 layers, and the number of stochastic layers may be less than 10, 5, or 3, in some cases. In some cases, the number of parameters of the neural network may be greater than 10,000; 100,000; 1,000,000; or 10,000,000; while the number of stochastic parameters may be less than 10%, 5%, 1%, or 0.1% of that. This is expected to address problems that arise when traditional probabilistic neural networks attempt to scale, which with many approaches, produces undesirably excessive scaling in memory or run time complexity. Other benefits expected of some embodiments include enhanced interpretability of trained neural networks based on statistical parameters of trained stochastic layers, the values of which may provide insight (e.g., through visualization, like by color coding layers or components thereof according to values of statistical parameters after training) into the contribution of various features in outputs of the neural network, enhanced privacy from injecting noise with granularity into select features or layers of the neural network making downstream layers our outputs less likely to leak information, and highlighting layers or portions thereof for pruning to compress neural networks without excessively impairing performance by removing those components that the statistical parameters indicate are not contributing sufficiently to performance. In some cases, the stochastic layers may be partially or fully constituted of differential parameters adjusted during training, which is expected to afford substantial benefits in terms of computational complexity during training relative to models with non-differentiable parameters. That said, embodiments are not limited to systems affording all of the these benefits, which is not to suggest that any other description is limiting.

Embodiments may include the application of noise described in U.S. Provisional Application 62/986,552 titled "METHODS OF PROVIDING DATA PRIVACY FOR NEURAL NETWORK BASED INFERENCE," filed on Mar. 6, 2020, or in U.S. Provisional Application 63/153,284 titled "METHODS AND SYSTEMS FOR SPECIALIZED DATASETS FOR TRAINING/VALIDATION OF MACHINE LEARNING," filed on Feb. 24, 2021, the contents of each or which are hereby incorporated by reference. In some cases, the stochastic layers and upstream deterministic layers may be implemented with computational memory or storage using the techniques described in U.S. Provisional Application 63/221,738, titled "REMOTELY-MANAGED, NEAR-STORAGE OR NEAR-MEMORY DATA TRANSFORMATIONS," filed on 14 Jul. 2021, the contents of which are hereby incorporated by reference. In some cases, training data of the model can be protected by application of stochastic noise and a model can be trained using techniques described in U.S. Provisional Application 63/311,014, titled "QUASI-SYNTHETIC DATA GENERATION FOR MACHINE LEARNING MODELS," filed on 16 Feb. 2022, the contents of which are hereby incorporated by reference. Embodiments may include the application of obfuscated training or stochastic conditional noise layers using techniques described in U.S. Provisional application titled "OBFUSCATED TRAINING AND INTERFERENCE WITH STOCHASTIC CONDITIONAL NOISE LAYERS," filed on the same day as this application, the contents of which are hereby incorporated by reference.

Figure 8:
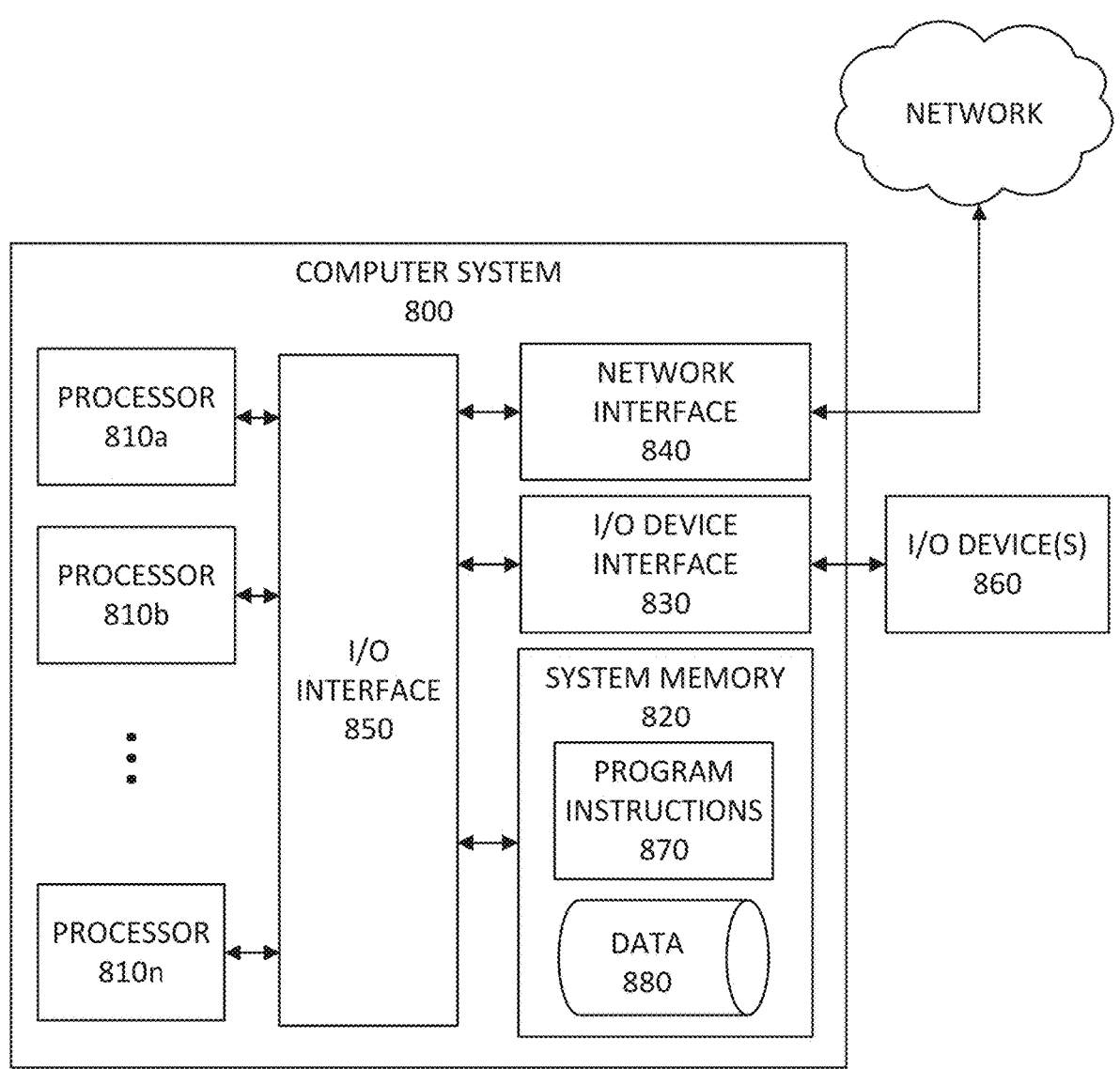
FIG. 8 shows an example computing device that may be used to implement some embodiments.

FIG. 8 is a diagram that illustrates an exemplary computing system 800 in accordance with embodiments of the present technique. Various portions of systems and methods described herein, may include or be executed on one or more computer systems similar to computing system 800. Further, processes and modules described herein may be executed by one or more processing systems similar to that of computing system 800.

Computing system 800 may include one or more processors (e.g., processors 810a-810n) coupled to system memory 820, an input/output I/O device interface 830, and a network interface 840 via an input/output (I/O) interface 850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 820). Computing system 800 may be a units-processor system including one processor (e.g., processor 810a), or a multi-processor system including any number of suitable processors (e.g., 810a-810n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 800 may include a plurality of computing devices (e.g., distributed computer systems) to implement various processing functions.

I/O device interface 830 may provide an interface for connection of one or more I/O devices 860 to computing system 800. I/O devices may include devices that receive input (e.g., from a user) or output information (e.g., to a user). I/O devices 860 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 may be connected to computing system 800 through a wired or wireless connection. I/O devices 860 may be connected to computing system 800 from a remote location. I/O devices 860 located on remote computer system, for example, may be connected to computing system 800 via a network and network interface 840.

Network interface 840 may include a network adapter that provides for connection of computing system 800 to a network. Network interface 840 may facilitate data exchange between computing system 800 and other devices connected to the network. Network interface 840 may support wired or wireless communication. The network may include an electronic communication network, such as the Internet, a local area network (LAN), a wide area network (WAN), a cellular communications network, or the like.

System memory 820 may be configured to store program instructions 870 or data 880. Program instructions 870 may be executable by a processor (e.g., one or more of processors

810a-810n) to implement one or more embodiments of the present techniques. Instructions 870 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 820 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 820 may include a non-transitory computer readable storage medium that may have program instructions stored thereon that are executable by a computer processor (e.g., one or more of processors 810a-810n) to cause the subject matter and the functional operations described herein. A memory (e.g., system memory 820) may include a single memory device and/or a plurality of memory devices (e.g., distributed memory devices).

I/O interface 850 may be configured to coordinate I/O traffic between processors 810a-810n, system memory 820, network interface 840, I/O devices 860, and/or other peripheral devices. I/O interface 850 may perform protocol, timing, or other data transformations to convert data signals from one component (e.g., system memory 820) into a format suitable for use by another component (e.g., processors 810a-810n). I/O interface 850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 800 or multiple computer systems 800 configured to host different portions or instances of embodiments. Multiple computer systems 800 may provide for parallel or sequential processing/execution of one or more portions of the techniques described herein.

Those skilled in the art will appreciate that computing system 800 is merely illustrative and is not intended to limit the scope of the techniques described herein. Computing system 800 may include any combination of devices or software that may perform or otherwise provide for the performance of the techniques described herein. For example, computing system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X' ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

The present techniques will be better understood when read in view of the following enumerated embodiments:

1. A tangible, non-transitory, machine-readable medium storing instructions that when executed by one or more processors effectuate operations comprising: obtaining, with a computer system, with a stochastic layer of a multi-layer neural network, inputs to the stochastic layer, wherein: the multi-layer neural network comprises both deterministic layers and the stochastic layer, and the stochastic layer comprises a plurality of parameters that vary stochastically according to respective probability distributions; determining, with the computer system, values of the plurality of parameters by randomly sampling from the respective probability distributions; determining, with the computer system, an output of the stochastic layer based on both the determined values of the plurality of parameters and the inputs to the stochastic layer; and providing, with the computer system, the output of the stochastic layer to a downstream layer of the multi-layer neural network or as an output of the multi-layer neural network.

2. The medium of embodiment 1, wherein: the respective probability distributions are parametric statistical distributions, each characterized, at least in part, by a respective pair of statistical parameters; and the operations further comprise learning, using gradient descent, for each of the respective probability distributions, the respective pairs of statistical parameters based on an objective function, wherein the objective function is differentiable with respect to the respective pairs of statistical parameters of the respective probability distributions.

3. The medium of any one of embodiments 1-2, the operations further comprising: performing a vulnerability analysis for the multi-layer neural network based on the respective probability distributions.

4. The medium of embodiment 3, wherein the vulnerability analysis measures a relationship between parameters of the respective probability distributions and performance of the multi-layer neural network.

5. The medium of any one of embodiments 1-4, the operations further com determining that a parameter characterizing dispersion of a given one of the respective probability distributions exceeds a threshold and, in response, pruning or making constant a corresponding perceptron in the multi-layer neural network to compress the multi-layer neural network.

6. The medium of any one of embodiments 1-5, wherein: the plurality of parameters are convolutional kernels;

the plurality of parameters are weights; and the probability distribution is at least one of a normal distribution, a Gaussian distribution, a Laplacian distribution, a binomial distribution, a multinomial distribution, or a combination thereof.

7. The medium of any one of embodiments 1-6, the operations further comprising: obtaining a deterministic, trained version of the multi-layer neural network; designating a subset of layers of the deterministic, trained version of the multi-layer neural network to be transformed into stochastic layers, the subset include a plurality of layers; and learning statistical parameters of parametric probability disruptions by iteratively, through a plurality of iterations, until a stopping condition is detected: computing partial derivatives of an objective function with respect to the statistical parameters; and adjusting the statistical parameters in directions that the partial derivatives indicate locally optimize the statistical parameters according to the objective function.

8. The medium of embodiment 7, wherein learning statistical parameters comprises learning a maximum dispersion of the parametric probability disruptions such that error of multi-layer neural network with the stochastic layers is minimized.

9. The medium of any one of embodiments 1-8, wherein the stochastic layer is learned optimizing statistical parameters of the probability distributions to minimize cross entropy relative to a deterministic version of the multi-layer neural network.

10. The medium of any one of embodiments 1-9, the operations further comprising: changing, between instances in which the multi-layer neural network responds to inputs, a first subset of layers of the multi-layer neural network from being deterministic to being stochastic and a second subset of layers of the multi-layer neural network from being stochastic to being deterministic, such that different layers are stochastic when responding to different ones of the inputs.

11. The medium of any one of embodiments 1-10, wherein the operations comprise: steps for learning probability distributions of the stochastic layer.

12. The medium of any one of embodiments 1-11, wherein the operations comprise: steps for applying the stochastic layer.

13. A tangible, non-transitory, machine-readable medium storing instructions that when executed by one or more processors effectuate operations comprising: obtaining, with a computer system, with a stochastic layer of a multi-layer neural network, inputs to the stochastic layer, wherein: the multi-layer neural network comprises both deterministic layers and the stochastic layer, and the stochastic layer is configured to: determine intermediate values based on the inputs to the stochastic layer and parameters of the stochastic layer that are static outside of training, and determine statistical parameters of a plurality of probability distributions based on the intermediate values; determining, with the computer system, the statistical parameters of the plurality of probability distributions based on both the parameters of the stochastic layer that are static outside of training and the inputs to the stochastic layer of the multi-layer neural network; and determining, with the computer system, an output of the stochastic layer by randomly sampling from the plurality of probability distributions having the determined statistical parameters; providing the output of the stochastic layer to a downstream layer of the multi-layer neural network or as an output of the multi-layer neural network.

14. The medium of embodiment 13, the operations further comprising: determining statistical parameters of the respective probability distributions based on an objective function, wherein the objective function is differentiable.

15. The medium of any one of embodiments 13-14, the operations further comprising: determining parameters of the respective probability distributions based on at least one of a stochastic gradient descent, back propagation, or a combination thereof.

16. The medium of any one of embodiments 13-15, the operations further comprising: determining a measure of protection for the multi-layer neural network based on the respective probability distributions.

17. The medium of any one of embodiments 13-16, operations further comprising: determining a measure of vulnerability for the multi-layer neural network based on the respective probability distributions.

18. The medium of any one of embodiments 13-17, the operations further comprising: determining a threshold for parameters of the respective probability distributions based on a threshold for performance of the multi-layer neural network.

19. The medium of any one of embodiments 13-18, wherein the plurality of parameters are convolutional kernels.

20. The medium of any one of embodiments 13-18, wherein the plurality of parameters are weights.

21. The medium of any one of embodiments 13-20, wherein the probability distribution is based on a Laplacian distribution.

22. A method for applying a stochastic noise layer to a machine learning model comprising: obtaining, with a computer system, with a stochastic layer of a multi-layer neural network, inputs to the stochastic layer, wherein: the multi-layer neural network comprises both deterministic layers and the stochastic layer, and the stochastic layer comprises a plurality of parameters that vary stochastically according to respective probability distributions; determining, with the computer system, values of the plurality of parameters by randomly sampling from the respective probability distributions; determining, with the computer system, an output of the stochastic layer based on both the determined values of the plurality of parameters and the inputs to the stochastic layer; and providing the output of the stochastic layer to a downstream layer of the multi-layer neural network or as an output of the multi-layer neural network.

23. The method of embodiment 19, further comprising: determining, with a computer system, parameters of the respective probability distributions based on an optimization function.

The invention claimed is:

1. A tangible, non-transitory, machine-readable medium storing instructions that when executed by one or more processors effectuate operations comprising:
obtaining, with a computer system, inputs to a stochastic layer of a multi-layer neural network, wherein:
the multi-layer neural network comprises both deterministic layers and the stochastic layer, and
the stochastic layer comprising a plurality of parameters that vary stochastically according to respective probability distributions, wherein the respective probability distributions are each characterized by one or more statistical parameters, and
wherein the one or more statistical parameters are learned with gradient descent based on an objective function, the objective function being at least partially differentiable with respect to the one or more statistical parameters and the objective function being based on output of the multi-layer neural network, and;
determining, with the computer system, values of the plurality of parameters of the stochastic layer by randomly sampling from the respective probability distributions;
determining, with the computer system, outputs of the stochastic layer based on both the determined values of the plurality of parameters and the inputs to the stochastic layer, the inputs to the stochastic layer being different from the determined values of the plurality of parameters and the inputs to the stochastic layer being different from the one or more statistical parameters; and
providing, with the computer system, the output of the stochastic layer to a downstream layer of the multi-layer neural network or as an output of the multi-layer neural network.

2. The medium of claim 1, the operations further comprising:
performing a vulnerability analysis for the multi-layer neural network based on the respective probability distributions,
wherein the vulnerability analysis measures relationships between sizes of the one or more statistical parameters of the respective probability distributions, and performance of the multi-layer neural network, and
wherein the respective probability distributions correspond to components of the input to the stochastic layer.

3. The medium of claim 2, wherein the component comprises a component of at least one of the following: a matrix, a tensor, a vector, a scalar, an embedding, an encoding, a pixel value, and an activation value.

4. The medium of claim 1, the operations further comprising:
determining that a given one or more statistical parameter characterizing dispersion for its respective probability distributions exceeds a threshold and, in response, pruning or making constant a corresponding perceptron in the multi-layer neural network to compress the multi-layer neural network.

5. The medium of claim 4, wherein pruning or making constant a corresponding perception comprises pruning or making constant a corresponding perceptron in a deterministic layer of the multi-layer neural network.

6. The medium of claim 1, wherein:
the stochastic layer comprises one or more convolutional kernels;
the plurality of parameters comprise weights of the convolutional kernels, each weight corresponding to a different respective probability distribution; and
the respective probability distributions are at least one of a normal distribution, a Gaussian distribution, a Laplacian distribution, a binomial distribution, a multinomial distribution, or a combination thereof.

7. The medium of claim 1, the operations further comprising:

obtaining a deterministic, trained version of the multi-layer neural network;

designating a subset of layers of the deterministic, trained version of the multi-layer neural network to be transformed into stochastic layers, the subset include a plurality of layers; and determining the values of the plurality of parameters for the respective probability distributions for the subset of layers transformed into the stochastic layers.

8. The medium of claim 7, wherein determining values of the plurality of parameters comprises determining a maximum dispersion for the probability distributions such that error of multi-layer neural network with the stochastic layers is minimized.

9. The medium of claim 1, wherein to the objective function is determined to minimize cross entropy relative to a deterministic version of the multi-layer neural network.

10. The medium of claim 1, the operations further comprising:

changing, between instances in which the multi-layer neural network responds to inputs, a first subset of layers of the multi-layer neural network from being deterministic to being stochastic and a second subset of layers of the multi-layer neural network from being stochastic to being deterministic, such that different layers are stochastic when responding to different ones of the inputs.

11. The medium of claim 1, wherein the operations comprise:

steps for learning probability distributions of the stochastic layer.

12. The medium of claim 1, wherein the operations comprise:

steps for applying the stochastic layer.

13. A tangible, non-transitory, machine-readable medium storing instructions that when executed by one or more processors effectuate operations comprising:

obtaining, with a computer system, inputs to a stochastic layer of a multi-layer neural network, wherein:

the multi-layer neural network comprises both deterministic layers and the stochastic layer, and the stochastic layer is configured to:

determine intermediate output values based on the inputs to the stochastic layer and based on random sampling from probability distributions of the stochastic layer, wherein statistical parameters of the probability distributions of the stochastic layer are static outside of training, and wherein the statistical parameters that are static outside of training are learned with gradient descent based on an objective function, the objective function being at least partially differentiable with respect to the statistical parameters and the objective function being based on output of the multi-layer neural network;

determining, with the computer system, an output of the stochastic layer based on the inputs and by randomly sampling from the probability distributions having the determined statistical parameters;

providing the determined output of the stochastic layer to a downstream layer of the multi-layer neural network or as an output of the multi-layer neural network.

14. The medium of claim 13, the operations further comprising:

determining the statistical parameters of the respective probability distributions based on at least one of a stochastic gradient descent, back propagation, or a combination thereof.

15. The medium of claim 13, the operations further comprising:

determining a measure of protection for the multi-layer neural network based on size of the statistical parameters of the respective probability distributions.

16. The medium of claim 13, operations further comprising:

determining a measure of vulnerability for the multi-layer neural network based on size of the statistical parameters of the respective probability distributions.

17. The medium of claim 13, the operations further comprising:

determining a threshold for the statistical parameters of the respective probability distributions based on a threshold for performance of the multi-layer neural network; and pruning or making constant nodes in the multi-layer neural network for which the statistical parameters exceed the threshold to compress the multi-layer neural network.

18. The medium of claim 13, wherein the statistical parameters corresponds to convolutional kernels.

19. The medium of claim 13, wherein statistical parameters corresponds to weights.

20. The medium of claim 13, wherein the probability distributions are based on Laplacian distributions.

21. A method for applying a stochastic noise layer to a machine learning model comprising:

obtaining with a computer system, with a stochastic layer of a multi-layer neural network, inputs to the stochastic layer, wherein:

the multi-layer neural network comprises both deterministic layers and the stochastic layer, and the stochastic layer comprises a plurality of parameters that vary stochastically according to respective probability distributions;

determining, with the computer system, values of the plurality of parameters by randomly sampling from the respective probability distributions;

determining, with the computer system, an output of the stochastic layer based on both the determined values of the plurality of parameters and the inputs to the stochastic layer, the inputs to the stochastic layer being different from the plurality of parameters that vary stochastically; and providing the output of the stochastic layer to a downstream layer of the multi-layer neural network or as an output of the multi-layer neural network.

22. The method of claim 21, further comprising:

determining, with a computer system, parameters of the respective probability distributions based on an optimization function.

23. A tangible, non-transitory, machine-readable medium storing instructions that when executed by one or more processors effectuate operations comprising:

obtaining, with a computer system, inputs to a stochastic layer of a multi-layer neural network, wherein:

the multi-layer neural network comprises both deterministic layers and the stochastic layer, and the stochastic layer comprising a plurality of parameters that vary stochastically according to respective probability distributions;

determining, with the computer system, values of the plurality of parameters of the stochastic layer by randomly sampling from the respective probability distributions, wherein:

the respective probability distributions are parametric statistical distributions, each characterized by one or more statistical parameters; and the operations further comprise:

learning, using gradient descent, for each of the respective probability distributions, the one or more statistical parameters based on an objective function, wherein the objective function is differentiable with respect to the one or more statistical parameters of the respective probability distributions; and determining that a parameter characterizing dispersion of a given one of the respective probability distributions exceeds a threshold and, in response, pruning or making constant a corresponding perceptron in the multi-layer neural network to compress the multi-layer neural network;

wherein the stochastic layer is learned optimizing the one or more statistical parameters of the probability distributions to minimize cross entropy relative to a deterministic version of the multi-layer neural network;

determining, with the computer system, outputs of the stochastic layer based on both the determined values of the plurality of parameters and the inputs to the stochastic layer, the inputs to the stochastic layer being different from the determined values of the plurality of parameters and the inputs to the stochastic layer being different from the one or more statistical parameters;

providing, with the computer system, the output of the stochastic layer to a downstream layer of the multi-layer neural network or as an output of the multi-layer neural network; and performing a vulnerability analysis for the multi-layer neural network based on the respective probability distributions, wherein the vulnerability analysis measures relationships between sizes of the one or more statistical parameters of the respective probability distributions, and performance of the multi-layer neural network, and wherein each of the respective probability distributions corresponds to a feature of the input to the stochastic layer.

24. A tangible, non-transitory, machine-readable medium storing instructions that when executed by one or more processors effectuate operations comprising:

obtaining, with a computer system, a multi-layer neural network, wherein the multi-layer neural network comprises deterministic layers;

adding, with the computer system, one or more stochastic layers to the multi-layer neural network, wherein the one or more stochastic layers comprise of a plurality of parameters that vary stochastically according to respective probability distributions;

wherein the respective probability distributions are parametric statistical distributions, each characterized, at least in part, by a respective pair of statistical parameters, and wherein the one or more stochastic layer operates on output from a first subset of the layers of the multi-layer neural network and provides output to a second subset of layers of the multi-layer neural network based on the output from the first subset of layers and randomly sampled values from the respective probability distributions, the randomly sampled values being different from the output from the first subset of layers;

learning, with the computer system, the statistical parameters of the respective probability distributions according to an objective function, the objective function comprising a relationship between the statistical parameters, a privacy parameter, and an accuracy parameter, the accuracy parameter relating operations of the multi-layer neural network with and without the one or more stochastic layers, wherein the objective function is at least partially differentiable with respect to the statistical parameters; and storing, with the computer system, the learned statistical parameters of the one or more stochastic layers.

* * * * *